US 6,625,390 B1

(12) United States Patent
Ito et al.

(10) Patent No.: US 6,625,390 B1
(45) Date of Patent: Sep. 23, 2003

(54) APPARATUS AND METHOD FOR RECORDING AND REPRODUCING DATA, AND AV SERVER

(75) Inventors: Norikazu Ito, Kanagawa (JP); Satoshi Yoneya, Kanagawa (JP); Masakazu Yoshimoto, Kanagawa (JP); Satoshi Katsuo, Kanagawa (JP); Jun Yoshikawa, Kanagawa (JP); Satoshi Yutani, Kanagawa (JP); Koichi Sato, Tokyo (JP); Tomohisa Shiga, Kanagawa (JP); Hiroyuki Fujita, Kanagawa (JP); Masaki Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/355,470

(22) PCT Filed: Dec. 4, 1998

(86) PCT No.: PCT/JP98/05498

§ 371 (c)(1),
(2), (4) Date: Aug. 30, 1999

(87) PCT Pub. No.: WO99/30224

PCT Pub. Date: Jun. 17, 1999

(30) Foreign Application Priority Data

Dec. 5, 1997 (JP) .......................... P09-336150
Dec. 5, 1997 (JP) .......................... P09-336151
Dec. 5, 1997 (JP) .......................... P09-336152

(51) Int. Cl.$^7$ ............................................. H04N 5/911
(52) U.S. Cl. ..................... 386/116; 386/124; 369/53.15
(58) Field of Search ........................... 386/40, 45, 116, 386/124–126, 109, 122; 369/30.34, 47.16, 30.23, 53.15; 711/114

(56) References Cited

U.S. PATENT DOCUMENTS

| | | | | |
|---|---|---|---|---|
| 5,719,985 A | * | 2/1998 | Ito et al. ...................... | 386/125 |
| 5,900,010 A | * | 5/1999 | Aoki et al. ................. | 369/30.34 |
| 6,185,368 B1 | * | 2/2001 | Iwasaki et al. .............. | 386/126 |
| 6,496,455 B1 | * | 12/2002 | Takagi et al. ............. | 369/47.16 |

FOREIGN PATENT DOCUMENTS

| | | |
|---|---|---|
| JP | 5-189257 | 7/1993 |
| JP | 7-38854 | 2/1995 |
| JP | 7-235143 | 9/1995 |
| JP | 7-235151 | 9/1995 |
| JP | 9-149354 | 6/1997 |
| JP | 9-200673 | 7/1997 |
| JP | 9-282801 | 10/1997 |
| JP | 9-320202 | 12/1997 |
| JP | 9-330178 | 12/1997 |

OTHER PUBLICATIONS

Patent Abstracts of Japan, JP 9–149354, Published Jun. 6, 1997, Hitachi Ltd.

(List continued on next page.)

Primary Examiner—Thai Tran
Assistant Examiner—Christopher Onuaker
(74) Attorney, Agent, or Firm—Bell, Boyd & Lloyd LLC

(57) ABSTRACT

A data recording and reproducing apparatus (11) which generates a plurality of divided data through dividing input data $D_1$ using a distributor (22) if recording data, while generating redundancy-code data P1 and P2 using Read-Solomon-code data which can perform error-correcting on a plurality of divided data, and records the divided data and the redundancy-code data P1, P2 on HDDs $21_1$ to $21_K$, $28_1$ and $28_Z$. The data recording and reproducing apparatus (11) reproduces the divided data and the redundancy-code data from the HDDs $21_1$ to $21_K$, $28_1$ and $28_Z$, performs error-correcting processing on the divided data based on the redundancy-code data by an error corrector (31), and outputs the divided data which have been error-corrected after multiplying the divided data by a data multiplier (32) if reproducing data.

41 Claims, 11 Drawing Sheets

OTHER PUBLICATIONS

Patent Abstracts of Japan, JP 5–189257, Published Jul. 30, 1993, Fujitsu Ltd.
Patent Abstracts of Japan, JP 9–330178, Published Dec. 22, 1997, Sony Corp.
Patent Abstracts of Japan, JP 9–320202, Published Dec. 12, 1997, Sony Corp.
Patent Abstracts of Japan, JP 9–282801, Published Oct. 31, 1997, Sony Corp.
Patent Abstracts of Japan, JP 9–200673, Published Jul. 31, 1997, Sony Corp.
Patent Abstracts of Japan, JP 7–235151, Published Sep. 5, 1995, Sony Corp.
Patent Abstracts of Japan, JP 7–235143, Published Sep. 5, 1995, Sony Corp.
Patent Abstracts of Japan, JP 7–038854, Published Feb. 7, 1995, Matsushita Electric Ind. Co. Ltd.

* cited by examiner and AV SERVER

TECHNICAL FIELD

The invention relates to an apparatus and a method for recording and reproducing data including video data and audio data, and AV (audio video) server.

BACKGROUND ART

In recent years, following multi-channeling of providing information owing to the familiarization of CATV (cable television) or the like, a demand for reproducing a plurality of visual/audio data simultaneously from a single data recording and reproducing apparatus, unlike VTRs (video tape recorder), has become higher. In order to satisfy this demand, a data recording and reproducing apparatus called a video server which records and reproduces visual/audio data using a random accessible recording and reproducing medium such as a hard disk is coming into wide use.

In general, a video server used in, for example, a broadcasting station is required to have a high transfer rate of data to be sent for obtaining high qualities of visual and audio, and a large capacitance to record data for a long period of time. Therefore, it has been tried to acquire a higher transfer rate of data and a larger capacitance by using a data recording and reproducing apparatus comprising a plurality of hard disk (HD in the followings) drives which can perform accumulation of visual and audio data, and parallel processing. Further, it has been tried to record parity data so as to ensure the reliability even if any of the HD drives accidentally breaks down. As a result, even in a case where different numbers of channels are requested due to contents or broadcasting systems of programs provided by a broadcasting station, it is possible to implement a multi-channel video server applicable to a variety of usage patterns, for example, establishing NVOD (near video on demand) systems by separately recording a plurality of material data and transmitting them through multi-channel simultaneously, or by reproducing the identical material data with a time-lag through multi-channel.

In a data recording and reproducing apparatus used in such a multi-channal video server, RAID (Redundant Arrays of Inexpensive Disks) technique proposed in the article presented by Patterson and some others in 1988, is used. In the article, the RAID is classified into five: RAID-1 to RAID-5. The typical ones among them are the RAID-1, the RAID-3 and the RAID-5. The RAID-1 is a method of writing the same contents on two HDDs.

The RAID-3 is a method of recording input data on a plurality of HDDs by dividing the data at a specific length, while generating parity data and writing them on another HDD.

FIG. 11 is a block diagram showing an example configuration of a data recording and reproducing apparatus using the RAID-3. This data recording and reproducing apparatus 101 comprises: a plurality of hard disk drives (referred as HDDs in the followings) $102_1$ to $102_N$ (N is an integer of 2 or more); an HDD 109 for recording parity data P as redundancy-code data; a data distributor 106 for generating a plurality of divided data by dividing input data $D_I$ at a specific length and for distributing each of the divided data to each of the HDDs $102_1$ to $102_N$; a parity generator 107 for generating parity data P from the divided data outputted from the data distributor 106; input memories $104_1$ to $104_N$ for temporarily keeping each divided data outputted from the data distributor 106; input memory 108 for temporarily keeping the parity data P outputted from the parity generator 107; controllers $103_1$ to $103_N$ and 110, which are respectively connected to the HDDs $102_1$ to $102_N$ and 109, for controlling recording the data kept by the input memories $104_1$ to $104_N$ and 108 on the HDDs $102_1$ to $102_N$ and 109, and for controlling reproducing data from the HDDs $102_1$ to $102_N$ and 109; output memories $105_1$ to $105_N$ and 111 for temporarily keeping data read out from each of the HDDs $102_1$ to $102_N$ and 109; an error corrector 112 for restoring the divided data by detecting and correcting errors based on the data kept by the output memories $105_1$ to $105_N$ and 111 and on error information which is described later; a data multiplier 113 for outputting the output data DO obtained by multiplying the output data from the error corrector 112; and a CPU 114 for controlling the whole apparatus.

Next, the data-writing operation of the data recording and reproducing apparatus 101 will be described. The input data $D_I$ is inputted to the data distributor 106, and a plurality of divided data are generated. Each of the divided data is distributed to be recorded on the input memories $104_1$ to $104_N$. It is also inputted to the parity generator 107. At this time, data may be distributed in order in the following manner: provided that, for example, the data are arranged in data lines D1, D2, D3, D4, D5, with a unit of bit or byte, the data D1 is distributed to the first HDD $102_1$, the data D2 is distributed to the second HDD $102_2$, and so forth, and if the data DN is distributed to the last HDD $102_N$, data is distributed in order to the HDDs beginning at the first HDD $102_1$ again.

The parity generator 107 generates the parity data P based on the divided data outputted from the data distributor 106 and outputs it. The input memory 108 temporarily records the parity data P. Then, the controllers $103_1$ to $103_N$ and 110 of the HDDs $102_1$ to $102_N$ and respectively 109 read out the divided data and the parity data P from the input memories $104_1$ to $104_N$ and 108 under the control of the CPU 114, and writes the data on the HDDs $102_1$ to $102_N$ and 109 respectively.

Next, the data-reading-out operation of the data recording and reproducing apparatus 101 will be described. Each of the controllers $103_1$ to $103_N$ and 110 reads out the divided data and the parity data P from the HDDs $102_1$ to $102_N$ and 109 respectively, and writes them on the output memories $105_1$ to $105_N$ and 111 respectively. At this time, if an error of data-reading-out operation (referred as reading-out error in the followings) occurs in the HDDs $102_1$ to $102_N$ and 109, error information indicating that an error has occurred is sent to the controllers $103_1$ to $103_N$ and 110 as status data from the control section in the HDDs $102_1$ to $102_N$ and 109. Then, the error information is sent to the CPU 114 as error information $ER_1$ to $Er_N$ and $Er_P$ from the controllers $103_1$ to $103_N$ and 110.

Each of the data recorded on the output memories $105_1$ to $105_N$ and 111 is synchronized and outputted to the error corrector 112. At this time, if the reading-out error occurs, error information showing that an error has occurred is sent to the error corrector 112 from the CPU 114. The error information includes information for identifying the HDD in which the reading-out error has occurred. The error corrector 112 restores the divided data based on the error information and the parity data P and outputs the divided data to the data multiplier 113. Data can be restored by the error corrector 112 only when reading-out errors have occurred in one HDD. When reading-out errors have occurred in a plurality of HDDs, the error corrector 112 can detect the errors but can not restore the data. The data multiplier 113 rearranges the divided data outputted from the error corrector 112 in the original data line and outputs it outside as the output data $D_O$.

In contrast, in the RAID-5, a unit(block) of dividing data is made larger and one divided data is recorded as a data block on one HDD, while exclusive OR (parity data) of the data blocks which correspond to one another and are recorded on the HDDs is calculated and the result is recorded as a parity block on another HDD. The parity block is thus distributed to all the HDDs.

FIG. 12 is a block diagram showing a configuration example of a data recording and reproducing apparatus using the RAID-5. This data recording and reproducing apparatus 201 comprises: a plurality of HDDs $202_1$ to $202_N$ (N is an integer of 2 or more) for recording input data; a parity generator-cum-error corrector 212 for generating parity data based on the input data $D_I$ and the data recorded on the HDDs $202_1$ to $202_N$, while restoring the data by correcting the error based on the data read out from each of the HDDs $202_1$ to $202_N$ and the error information; input memories $204_1$ to $204_N$ for temporarily keeping the output data of the parity generator-cum-error corrector 212; controllers $203_1$ to $203_N$, which are connected to the HDDs $202_1$ to $202_N$ respectively, for controlling the operation of recording the data kept by the input memories $204_1$ to $204_N$ on the HDDs $202_1$ to $202_N$ and the operation of reproducing the data from the HDDs $202_1$ to $202_N$; output memories $205_1$ to $205_N$ for temporarily keeping the data read out from the IHDDs $202_1$ to $202_N$ respectively; and a CPU 214 for controlling the whole apparatus. Further, if an error of data-reading-out operation occurs in any of the HDDs $202_1$ to $202_N$, error information indicating that an error has occurred is sent to controllers $203_1$ to $203_N$ as status data from the control section in the HDDs $202_1$ to $202_N$. Further, the error information are sent to the CPU 214 as error information $ER_1$ to $Er_N$ from the controllers $203_1$ to $203_N$.

Next, the data-writing operation of the data recording and reproducing apparatus 201 will be described. For example, if writing the data D onto an address A in the HDD $202_1$, the CPU 214 controls the controllers $203_1$ and $203_2$ to read out the recorded data $D_1$ from the HDD $202_1$ and so as to read out the parity data P from the HDD $202_2$, provided that the parity data P corresponding to the data D is recorded on the HDD $202_2$. At this time, the parity generator-cum-error corrector 212 calculates exclusive OR of the data $D_1$ and the parity data P, and restores parity data $P_1$ without the data $D_1$. Then, the parity generator-cum-error corrector 212 calculates exclusive OR of the data D and the parity data $P_1$ to obtain another parity data $D_2$. The CPU 214 controls the controllers $203_1$ 1 and $203_2$ to write the data D onto the HDD $202_1$ and to write the parity data $P_2$ onto the HDD $202_2$.

Next, the data-reading-out operation of the data recording and reproducing apparatus 201 will be described. For example, if reading out the data D from the address A in the HDD $202_2$, the CPU 214 controls the controller $203_1$ to read out the data D from the HDD $202_1$. At this time, if the reading-out error does not occur, the CPU 214 controls the parity generator-cum-error corrector 212 to output the data D read out from the HDD $202_1$ as the output data $D_O$ through the output memory $205_1$ and the parity generator-cum-error corrector 212. At this time, no particular processing is performed in the parity generator-cum-error corrector 212.

On the other hand, if data in the data recording and reproducing apparatus 201 is not read out normally, that is, if the data D can not be read out from the address A in the HDD $202_1$ because of a defective sector or the like, the CPU 214 receives the error information $ER_1$ from the controller $203_1$. In such a case, the CPU 214 reads out data from the corresponding addresses in other HDDs $202_2$ to $202_N$, send them to the parity generator-cum-error corrector 212 and controls the parity generator-cum-error corrector 212 to reproduce the data D based on the above-mentioned data to output them as the output data $D_O$.

As described, if writing input data in the data recording and reproducing apparatus 201 using the RAID-5, the number of access increases since reading out and writing the data block, and reading out and writing the parity block are required to be performed. Further, if an error occurs if reading out data, the data is restored by reading out data from another HDD so that the number of access also increases. Accordingly, the data recording and reproducing apparatus 201 using the RAID-5 is fit for use in a random access processing of logical blocks of a specific size, but not in a processing which requires a real-time operation.

In contrast, in the data recording and reproducing apparatus 101 using the RAID-3, input data can be written by one access, and error-correction after reading out data can be immediately performed. Accordingly, the data recording and reproducing apparatus 101 using the RAID-3 is fit for use in a processing for recording and reproducing data with high-speed. Therefore, a data recording and reproducing apparatus using the RAID-3 is suitable for a device such as a multi-channel video server which requires a real-time operation.

In the above-mentioned data recording and reproducing apparatus using the RAID-3, however, data can be restored only when reading-out errors have occurred in one HDD. This causes a problem that the apparatus becomes incapable of error detection and correction of data if any of the HDDs breaks down.

Moreover, in the data recording and reproducing apparatus using the RAID-3, if one of the HDDs reads out invalid data without an reading-out error being generated, it is impossible to obtain information indicating which HDD has read out the invalid data, although it is possible to detect the error of data. This results in a problem that data can not be restored.

The data recording and reproducing apparatus using the RAID-3 has another problem that data can not be restored if two or more HDDs break down, although it is possible to detect the error of data.

Furthermore, when an error (referred as writing error in the followings) occurs during the writing operation in any of the HDDs in the data recording and reproducing apparatus, it is necessary to restore the data in which the writing error occurred. This data-restoring processing performed on part of the recording region of the recording medium (hard disk) is called a portion-rebuild processing (Portion Rebuild) in this application. On the other hand, if any of the HDDs in the data recording, and reproducing apparatus is replaced, it is necessary to rebuild the original data on the new HDD. This data-restoring processing performed on the whole recording region of the recording medium (hard disk) is called a whole-rebuild processing (Whole Rebuild) in this application. In the followings, the data-restoring-processing operation in the data recording and reproducing apparatus 101 using the RAID-3 shown in FIG. 11 will be described.

First, the operation of the Portion Rebuild will be described. The CPU 114 stores the HDD and the address (sector) in which the writing errors have occurred, and the Portion Rebuild is performed on the HDD and the address. In the Portion Rebuild, first, the CPU 114 controls each of the controllers 103₁ to 103_N and 110 to perform the reading-out operation, appointing the address on which the Portion Rebuild is to be performed. In response, the controllers 103₁ to 103_N and 110 read out the data in the appointed address from the HDDs 102₁ to 102_N and 109 respectively. The read-out data is inputted to the error corrector 112 through the output memories 105₁ to 105_N and 111. At this time, the CPU 114 gives a command for the error corrector 112 not to use the data read out from the HDD on which the Portion Rebuild is to be performed. The error corrector 112 restores the divided data using the data outputted from the output memories 105₁ to 105_N and 111 except the data read out from the HDD on which the Portion Rebuild is to be performed, and outputs the divided data which has been restored to the data multiplier 113. The data multiplier 113 rearranges the divided data outputted from the error corrector 112 in the original data line, and outputs it as the output data $D_O$. Next, under the control of the CPU 114, the output data $D_O$ is inputted from the data multiplier 113 to the data distributor 106. The restored divided data is written onto the HDD on which the Portion Rebuild is to be performed by performing the same writing operation as the writing operation of input data $D_I$, and the Portion Rebuild is ended.

Next, the operation of the Whole Rebuild will be described. If a predetermined HDD is replaced and the superior device issues a command for the data recording and reproducing apparatus 101 to perform the Whole Rebuild, the CPU 114 makes the controllers 103₁ to 103_N and 110 perform the reading-out operation upon receiving the command. In response, the controllers 103₁ to 103_N and 110 read out data from the HDDs 102₁ to 102_N and 109 respectively. The read-out data is inputted to the error corrector 112 through the output memories 105₁ to 105_N and 111. At this time, the CPU 114 gives a command for the error corrector 112 not to use the data read out from the HDD on which the Whole Rebuild is to be performed. The error corrector 112 restores the divided data using the data outputted from the output memories 105₁ to 105_N and 11₁ except the data read out from the HDD on which the Whole Rebuild is to be performed, and outputs the divided data which has been restored to the data multiplier 113. The data multiplier 113 rearranges the restored divided data outputted from the error corrector 112 in the original data line, and outputs it as the output data $D_O$. Next, under the control of the CPU 114, the output data $D_O$ is inputted from the data multiplier 113 to the data distributor 106. The restored divided data is written onto the HDD on which the Whole Rebuild is to be performed by performing the same writing operation as the writing operation of input data $D_I$. The processing described above is performed on the whole recording region of the hard disk.

In both cases of the Portion Rebuild and the Whole Rebuild described above, however, data-restoring during the rebuild processing can be performed only if the correct data has been read out in all the HDDs except for the HDD on which the rebuild processing is to be performed. If a writing error occurs even in one of the other HDDs than the HDD on which the rebuild processing is to be performed, the error can be detected in the error corrector 112 but data can not be restored. That is, the data recording and reproducing apparatus 101 using the RAID-3 has a problem that data can not be restored if another trouble occurs since the apparatus is incapable of detecting errors and correcting of data during the rebuild processing.

In the meantime, a plurality of tracks are provided on a hard disk in a concentric circular pattern. A plurality of sectors, which are recording unit of data, are provided by dividing the tracks in a radial pattern. There may be a case where these sectors include sectors in which errors always occur at the time of writing or reading out data. Such sectors are called defective sectors. Defective sectors are considered to be in conditions in which reading out or writing data can not be correctly performed because of physical damage or the like. In case that there should be defective sectors, spare sectors may be provided on the hard disk so that data can be recorded on the spare sectors instead of the defective sectors if necessary. Such a spare sector is called a substitute sector. In the HDD having substitute sectors, the control section in the HDD includes a correspondence table showing the correspondence between logical sector numbers (LBA) and physical sector numbers so that the substitute sectors used instead of the defective sectors can be referred by the same sector number as the defective sectors from the superior devices. Accordingly, if there is a defective sector, a re-allotting processing (Reassign), in which the correspondence between LBA and the physical sector number in the recording region on the hard disk is changed, is to be performed.

The Reassign requires relatively long time (several seconds). Therefore, in general, it is not performed during the operation of a data recording and reproducing apparatus of the related art. In an apparatus which requires a real-time operation such as a multi-channel video server, however, it is desirable that the Reassign should be performed even during the operation of the apparatus, since stopping the operation of the apparatus because of the Reassign can be very inconvenient.

As described in the followings, the Reassign may also be performed during the operation of the data recording and reproducing apparatus. In the followings, the operation of the Reassign if performed during the operation of the data recording and reproducing apparatus 101 using the RAID-3 shown in FIG. 11 will be described.

If the superior device gives a command for the data recording and reproducing apparatus 101 to perform the Reassign, the CPU 114, upon receiving the command, suspends the writing operation and the reading-out operation on/from the HDD on which the Reassign is to be performed. Next, the CPU 114 makes the Reassign be performed on the HDD on which the Reassign is to be performed, appointing the sector on which the Reassign is to be performed. The Reassign is, as described, to change the correspondence between LBA and the physical sector number. If the CPU 114 receives a command to perform writing, during the Reassign, it makes the writing operation be performed on the HDDs except the HDD on which the Reassign is to be performed while storing the HDD on which the Reassign is to be performed and LBA onto which writing is to be performed according to the command. If the CPU 114 receives a command to perform reading-out, during the Reassign, it makes the reading-out operation be performed on the HDDs other than the HDD on which the Reassign is to be performed, and gives a command for the error corrector 112 to perform the error correction voiding the data from the HDD on which the Reassign is to be performed. If the Reassign is completed, the CPU 114 cancels the suspension of the writing operation and the reading-out operation onto/from the HDD on which the Reassign has been performed.

After the Reassign is performed as described, it is necessary to restore the data recorded on the HDD and the address on which the Reassign has been performed, and the data recorded on the HDD and the address which have been stored during the suspension of the writing operation in the process of the Reassign. This restoring processing of data is described above.

Accordingly, the data recording and reproducing apparatus blusing the RAID-3 becomes incapable of detecting and correcting errors of data during the Reassign. It is, therefore, difficult to perform the Reassign during the operation of the apparatus without a considerable decrease in the reliability of the apparatus.

Incidentally, a method in which the RAID-5 is expanded is proposed as introduced in the document "The latest secondary storage: Disk array: by KIRENGAWA" (Information Processing, Vol.34, No.5, pp.642–651, Published in May, 1993). This is a method in which two parity blocks based on Read-Solomon coding are provided to be able to cope with troubles in two HDDs at most within a parity group.

In the method in which the RAID-5 is expanded, the number of the access increases compared to that of the RAID-5 when errors occur at the time of writing input data or reading out data. The method is, therefore, not suitable for a processing which requires the real-time operation any more than the RAID-5 is. Accordingly, it is difficult to use the above-mentioned method in which the RAID-5 is expanded in the apparatus which requires a real-time operation such as a multi-channel video server.

In addition, in a regular data recording and reproducing apparatus using a plurality of the HDDs, the data-restoring processing such as the Whole Rebuild or the Portion Rebuild as described is performed fever necessary, and it is impossible to access the data recording and reproducing apparatus from outside during the restoring processing. This is a disadvantage of the apparatus which requires a real-time operation such as a multi-channel video server since stopping the operation of the apparatus because of the data-restoring processing can be very inconvenient.

DISCLOSURE OF THE INVENTION

The invention is designed to overcome the foregoing problems. The first object of the invention is to provide an apparatus and a method for recording and reproducing data, and an AV server which are excellent in ability to detect and correct errors of data and are suitable for a processing which requires a real-time operation.

The second object of the invention is to provide an apparatus and a method for recording and reproducing data, and an AV server which can detect and correct errors of data even during the data-restoring processing and are suitable for a processing which requires a real-time operation.

The third object of the invention is to provide an apparatus and a method for recording and reproducing data, and an AV server which are made to be able to perform the data-restoring operation without interrupting the operation of recording and reproducing data, in addition to the above-mentioned second object.

The fourth object of the invention is to provide an apparatus and a method for recording and reproducing data, and an AV server which are made to be able to perform error-detection and correction of data even during the re-allotting processing so that it can perform the re-allotting processing without interrupting the operation of recording and reproducing data, and are suitable for a processing which requires a real-time operation.

The fifth object of the invention is to provide an apparatus and a method for recording and reproducing data, and an AV server which can perform error detection and correction of data also in the data-restoring processing after the re-allotting processing, in addition to the fourth object.

A data recording and reproducing apparatus of the invention comprises: means for recording and reproducing divided data for recording a plurality of divided data obtained through dividing input data by a predetermined unit on a first non-linear accessible recording medium, while reproducing the divided data recorded on the first recording medium; and means for recording and reproducing error-correcting-code data for generating a plurality of error-correcting-code data for the divided data to record the error-correcting-code data on a second non-linear accessible, while reproducing the error-correcting-code data recorded on the second non-linear accessible recording medium.

In the data recording and reproducing apparatus of the invention, a plurality of divided data obtained through dividing input data by a predetermined unit are recorded on first non-linear accessible recording media, and the divided data recorded on the first recording media are reproduced by the means for recording and reproducing divided data. In addition, a plurality of the error-correcting-code data for the divided data is generated to be recorded on second non-linear accessible recording media while the error-correcting-code data recorded on the second non-linear accessible recording media are reproduced by the means for recording and reproducing error-correcting-code data.

An AV server of the invention comprises: a plurality of input/output processing means for converting data including visual and audio data inputted form outside to data which can be recorded on a non-linear accessible recording medium, while outputting the data outputted from the recording medium after converting the data to data which can be outputted outside; means for recording and reproducing divided data for recording a plurality of divided data obtained through dividing data outputted from each of the input/output processing means on a first non-linear accessible recording medium, while reproducing the divided data recorded on the first non-linear accessible recording medium; and means for recording and reproducing error-correcting-code data for generating a plurality of error-correcting-code data for the divided data to record the error-correcting-code data on a second non-linear accessible recording medium while reproducing the error-correcting-code data recorded on the second non-linear accessible recording medium.

In the AV server of the invention, data including visual and audio data inputted from outside is converted to the data which can be recorded on non-linear accessible recording media, and the data outputted from the recording media is outputted after being converted to the data which can be outputted outside by a plurality of input/output processing means. A plurality of divided data obtained through dividing data outputted from each of the input/output processing means are recorded on first non-linear accessible recording media, while the divided data recorded on the first non-linear accessible recording media are reproduced by the means for recording and reproducing divided data. In addition, a plurality of error-correcting-code data for the divided data are generated to be recorded on second non-linear accessible recording media while the error-correcting-code data recorded on the second non-linear accessible recording media are reproduced by the means for recording and reproducing error-correcting-code data.

A method of recording and reproducing data of the invention includes: a first step of recording a plurality of divided data obtained through dividing input data by a predetermined unit on a first non-linear accessible recording medium, while generating a plurality of error-correcting-code data for the divided data to record the error-correcting-code data on a second non-linear accessible recording medium; and a second step of reproducing the divided data recorded on the first non-linear accessible recording medium in the first step, while reproducing the error-correcting-code data recorded on the second non-linear accessible recording medium.

Another data recording and reproducing apparatus of the invention comprises: dividing means for generating a plurality of divided data by dividing input data by a predetermined unit; means for generating error-correcting-code data for generating a plurality of error-correcting-code data corresponding to the divided data, the divided data being inputted to the means for generating error-correcting-code data; means for recording and reproducing divided data for recording the divided data on first non-linear accessible recording media, respectively, the divided data being inputted to the means for recording and reproducing divided data, while reproducing the divided data recorded on the first non-linear accessible recording media; means for recording and reproducing error-correcting-code data for recording a plurality of the error-correcting-code data on a second non-linear accessible recording media, respectively, the error-correcting-code data being generated by the means for generating error-correcting-code data and inputted to the means for recording and reproducing error-correcting-code data, while reproducing the error-correcting-code data recorded on the second non-linear accessible recording media; error-correcting means for performing error-correcting processing on the divided data using the error-correcting-code data, the error-correcting-code data being reproduced by the means for recording and reproducing error-correcting-code data and inputted to the error-correcting means, and the divided data being reproduced by the means for recording and reproducing divided data and inputted to the error-correcting means; and multiplying means for multiplying and outputting the divided data, the divided data being outputted from the error-correcting means and inputted to the multiplying means.

Still another data recording and reproducing apparatus of the invention comprises: means for recording and reproducing divided data for recording a plurality of divided data obtained through dividing input data by a predetermined unit on a first non-linear accessible recording medium, while reproducing the divided data recorded on the first non-linear accessible recording medium; means for recording and reproducing error-correcting-code data for generating a plurality of error-correcting-code data for the divided data to record the error-correcting-code data on a second non-linear accessible recording medium, while reproducing the error-correcting-code data recorded on the second non-linear accessible recording medium; error-correcting means for performing error-correcting processing on the divided data reproduced from the means for recording and reproducing divided data using the error-correcting-code data reproduced from the means for recording and reproducing error-correcting-code data; means for controlling data-restoring processing for performing restoring processing on the divided data through: controlling the means for recording and reproducing divided data and the means for recording and reproducing error-correcting-code data to reproduce the divided data and the error-correcting-code data corresponding to the divided data, which are recorded on the first non-linear accessible recording medium and the second non-linear accessible recording medium, respectively, except the divided data to be restored; controlling the error-correcting means to perform error-correcting processing on the divided data based on the divided data and the error-correcting-code data; and controlling the means for recording and reproducing divided data to record the divided data to be restored on which the error-correcting processing has been performed on the first non-linear accessible recording medium.

A further data recording and reproducing apparatus of the invention comprises: means for recording and reproducing divided data for recording a plurality of divided data obtained through dividing input data by a predetermined unit on a plurality of first non-linear accessible recording media, respectively, while reproducing the divided data recorded on the first recording media; means for recording and reproducing error-correcting-code data for generating a plurality of error-correcting-code data for the divided data to record the error-correcting-code data on a second non-linear accessible recording medium, while reproducing the error-correcting-code data recorded on the second recording medium; and means for controlling re-allotting processing for controlling the means for recording and reproducing divided data to exclude the first recording medium subject to re-allotting processing, in which to the correspondence between logical address and physical address in the recording region of the first recording media is changed, from other first recording media on which recording and reproducing are performed by the means for recording and reproducing divided data, and to perform the re-allotting processing.

Another method of recording and reproducing data of the invention includes: a first step of generating a plurality of divided data by dividing input data by a predetermined unit; a second step of generating a plurality of error-correcting-code data corresponding to the divided data, the divided data being inputted; a third step of recording the divided data on a first non-linear accessible recording medium, the divided data being inputted, while recording the error-correcting-code data on a second non-linear accessible recording medium; a fourth step of reproducing the divided data from the first non-linear accessible recording medium, while reproducing the error-correcting-code data from the second non-linear accessible recording medium; a fifth step of performing error-correcting processing on the divided data using the error-correcting-code data if any of the divided data can not be reproduced in the fourth step, the divided data and the error-correcting-code data being reproduced in the fourth step and inputted; and a sixth step of multiplying and outputting the divided data, the divided data being outputted in the fifth step and inputted.

Still another method of recording and reproducing data of the invention includes: a first step of recording a plurality of divided data obtained through dividing input data by a predetermined unit on a first non-linear accessible recording medium, while generating a plurality of error-correcting-code data for the divided data to record them on a second non-linear accessible recording medium; a second step of reproducing the divided data recorded on the first recording medium in the first step, while reproducing the error-correcting-code data recorded on the second non-linear accessible recording medium; a third step of performing error-correcting processing on the divided data reproduced in the second step based on the error-correcting-code data reproduced in the second step; and a fourth step of performing restoring processing on the divided data which can not be recorded on the first recording medium in the first step and needs to be restored and re-recorded thereon through:

reproducing the divided data and the error-correcting-code data corresponding to the divided data, which are recorded on the first recording medium and the second recording medium, respectively, except the divided data to be restored, from the first recording medium and the second recording medium; performing error-correcting processing on at least the divided data to be restored based on the reproduced divided data and the error-correcting-code data which have been reproduced; and re-recording the divided data to be restored on which the error-correcting processing has been performed on the first recording medium.

A further method of recording and reproducing data of the invention includes: a first step of recording a plurality of divided data obtained through dividing input data by a predetermined unit on a first non-linear accessible recording medium, while generating a plurality of error-correcting-code data for the divided data to record error-correcting-code data on a second non-linear accessible recording medium; a second step of reproducing the divided data recorded on the first non-linear accessible recording medium in the first step, while reproducing the error-correcting-code data recorded on the second non-linear accessible recording medium; and a third step of excluding the first recording medium subject to re-allotting processing, in which the correspondence between the logical address and physical address in the recording region of the first recording medium is changed, from other first recording media on which recording and reproducing are performed by the means for recording and reproducing divided data in the first and second steps, and of performing re-allotting processing.

Another AV server of the invention comprises: a plurality of input/output processing means for converting data including visual and audio data inputted from outside to data which can be recorded on a non-linear accessible recording medium, while outputting the data outputted from the recording medium after converting the data to data which can be outputted outside; means for recording and reproducing divided data for recording a plurality of divided data obtained through dividing the data outputted from each of the input/output processing means on a first non-linear accessible recording medium, while reproducing the divided data recorded on the first non-linear accessible recording medium; means for recording and reproducing error-correcting-code data for generating a plurality of the error-correcting-code data for the divided data to record the error-correcting-code data on a second non-linear accessible recording medium, while reproducing the error-correcting-code data recorded on the second non-linear accessible recording medium; error-correcting means for performing error-correcting processing on the divided data reproduced from the means for recording and reproducing divided data using the error-correcting-code data reproduced from the means for recording and reproducing error-correcting-code data; and means for controlling data restoring processing for performing restoring processing on the divided data through: controlling the means for recording and reproducing divided data and the means for recording and reproducing error-correcting-code data to reproduce the divided data and the error-correcting-code data corresponding to the divided data, which are recorded on the first non-linear accessible recording medium and the second non-linear accessible recording medium, respectively, except the divided data to be restored; controlling the error-correcting means to perform error-correcting processing on the divided data based on the divided data and the error-correcting-code data which have been reproduced; and controlling the means for recording and reproducing divided data to record the divided data to be restored on which the error-correcting processing has been performed on the first non-linear accessible recording medium.

Still another AV server of the invention comprises: a plurality of input/output processing means for converting data including visual and audio data inputted from outside to data which can be recorded on a non-linear accessible recording medium, while outputting the data outputted from the recording medium after converting the data to data which can be outputted outside; means for recording and reproducing divided data for recording a plurality of divided data obtained through dividing data outputted from each of the input/output processing means on a first non-linear accessible recording medium, while reproducing the divided data recorded on the first non-linear accessible recording medium; means for recording and reproducing error-correcting-code data for generating the error-correcting-code data for the divided data to record the error-correcting-code data on a second non-linear accessible recording medium, while reproducing the error-correcting-code data recorded on the second non-linear accessible recording medium; and means for controlling re-allotting processing for controlling the means for recording and reproducing divided data to exclude the first recording medium subject to re-allotting processing, in which the correspondence between logical address and physical address in the recording region of the first recording medium is exchanged from other first recording media on which recording and reproducing are performed by the means for recording and reproducing divided data, and to perform the re-allotting processing.

BEST MODE FOR CARRYING OUT THE INVENTION

In the followings, the best modes for embodying the invention will be described in detail with reference to the drawings.

Figure 1:
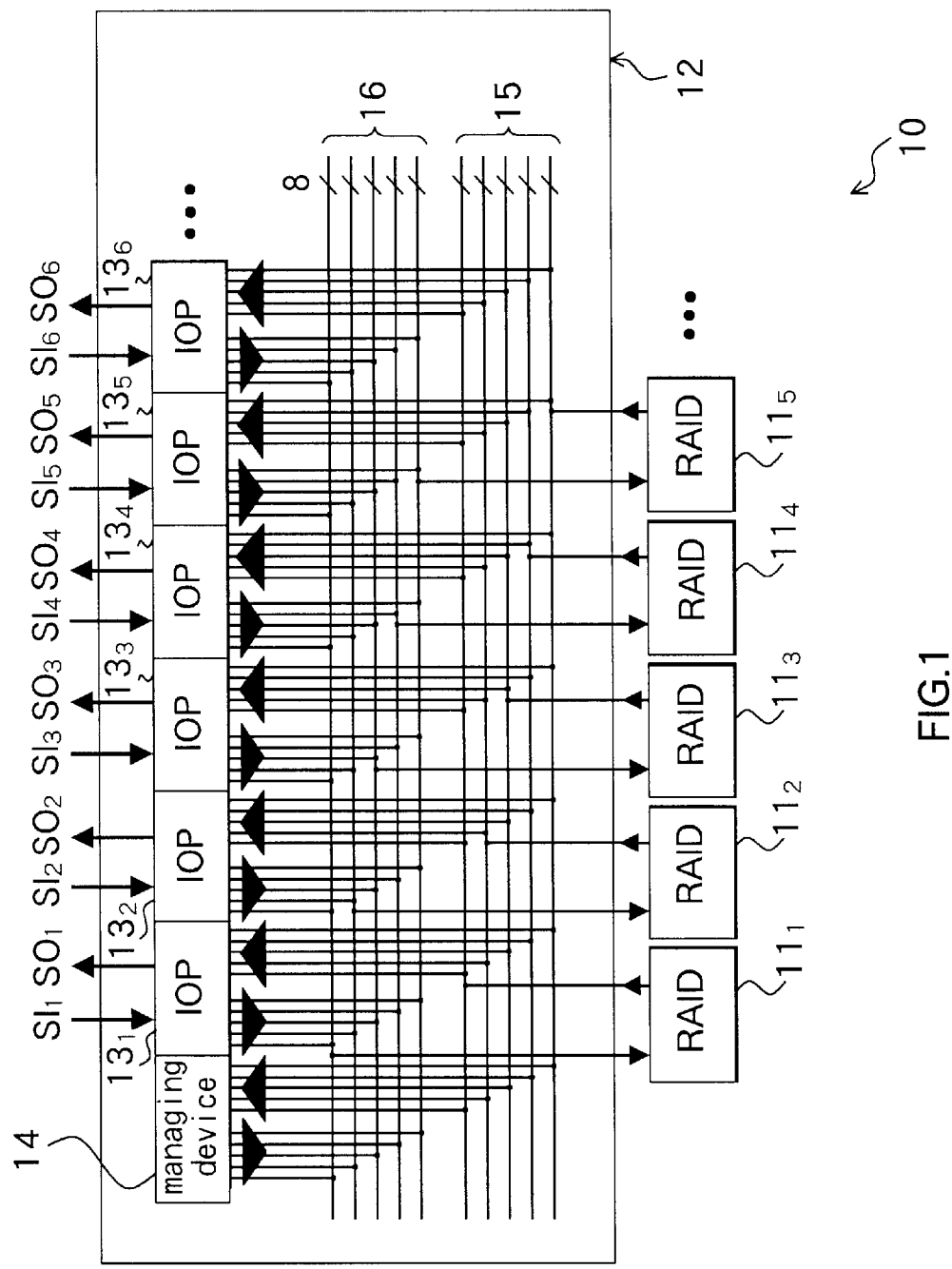
FIG. 1 is a block diagram showing a configuration example of a video server which includes a data recording and reproducing apparatus according to an embodiment of the invention.

FIG. 1 is a block diagram showing a configuration example of a video server which includes a data recording and reproducing apparatus according to an embodiment of the invention. This video server 10 is used as a multi-channel video server. The video server 10 comprises a plurality of data recording and reproducing apparatuses (referred as RAID in figure) $11_1$ to $11_n$ (n is an integer of 2 or more) according to the embodiment for recording and reproducing data including video data, and an input/output processor section 12 for inputting data to be recorded on the data recording and reproducing apparatuses $11_1$ to $11_n$ and outputting data reproduced from the data recording and reproducing apparatuses $11_1$ to $11_n$.

The input/output processor section 12 includes a plurality of input/output processors (referred as IOP in figure) $13_1$ to $13_m$ (m is an integer of 2 or more) for accessing to the data recording and reproducing apparatus $11_1$ to $11_n$ so as to record or reproduce data on/from the data recording and reproducing apparatuses $11_1$ to $11_n$ respectively in a time-divided manner, with a unit of time slots, which are a plurality of the time-division divided by a specific time interval, a managing device 14 for managing material information and the like, and up data buses 15 and down data buses 16 for connecting the input/output processor $13_1$ to $13_m$, the managing device 14 to the data recording and reproducing apparatuses $11_1$ to $11_n$. The same number of the up data buses 15 and the down data buses 16 as the number of the data recording and reproducing apparatuses $11_1$ to $11_n$ are provided. Each up data bus 15 is connected to one data recording and reproducing apparatus $11_i$ (i is any integer between 1 and n), the input/output processor $13_1$ to $13_m$ and the managing device 14 and so is each down data bus 16. That is, an input/output processor $13_j$ (j is any integer between 1 and m) and the managing device 14 are connected to a plurality of the up data buses 15 and a plurality of the down data buses 16. Incidentally, in the embodiment, the down data bus 16 is for transmitting data from the input/output processor $13_1$ to $13_m$ and the managing device 14 to the data recording and reproducing apparatuses $11_1$ to $11_n$. The up data bus 15 is for transmitting data the other way around.

Each of the input/output processors $13_j$ is made to convert input signals $SI_j$ such as video signals to data in a predetermined format if recording data, and transmit the data and a command to record the data to the data recording and reproducing apparatus $11_1$ to $11_n$ through the down data bus 16. Each of the input/output processors $13_j$ is also made to transmit a command to reproduce data to the data recording and reproducing apparatuses $11_1$ to $11_n$ through the down data bus 16 if reproducing data, to convert the data reproduced from the data recording and reproducing apparatuses $11_1$ to $11_n$ and transmitted through the up data bus 15 to a predetermined signal, and to output it as an output signal $SO_j$ outside.

The data recording and reproducing apparatus $11_i$ comprises a plurality of HDDs for recording input data and redundancy-code data. When recording data, the data recording and reproducing apparatus $11_i$ is made to receive input data and a command from the input/output processor $13_i$ through the down data bus 16, to generate a plurality of divided data by dividing the input data by a predetermined unit while generating the redundancy-code data based on the input data, and to record the divided data and the redundancy-code data on a plurality of the HDDs according to the command. When reproducing data, the data recording and reproducing apparatus $11_i$ is made to receive a command from the input/output processors $13_j$ through the down data bus 16, to reproduce the divided data and the redundancy-code data by controlling a plurality of the HDDs in accordance with the command, to correct errors of the divided data using the redundancy-code data, to multiply the divided data which have been error-corrected, and to output them to the input/output processors $13_j$ through the up data bus 15 as the output data.

Figure 2:
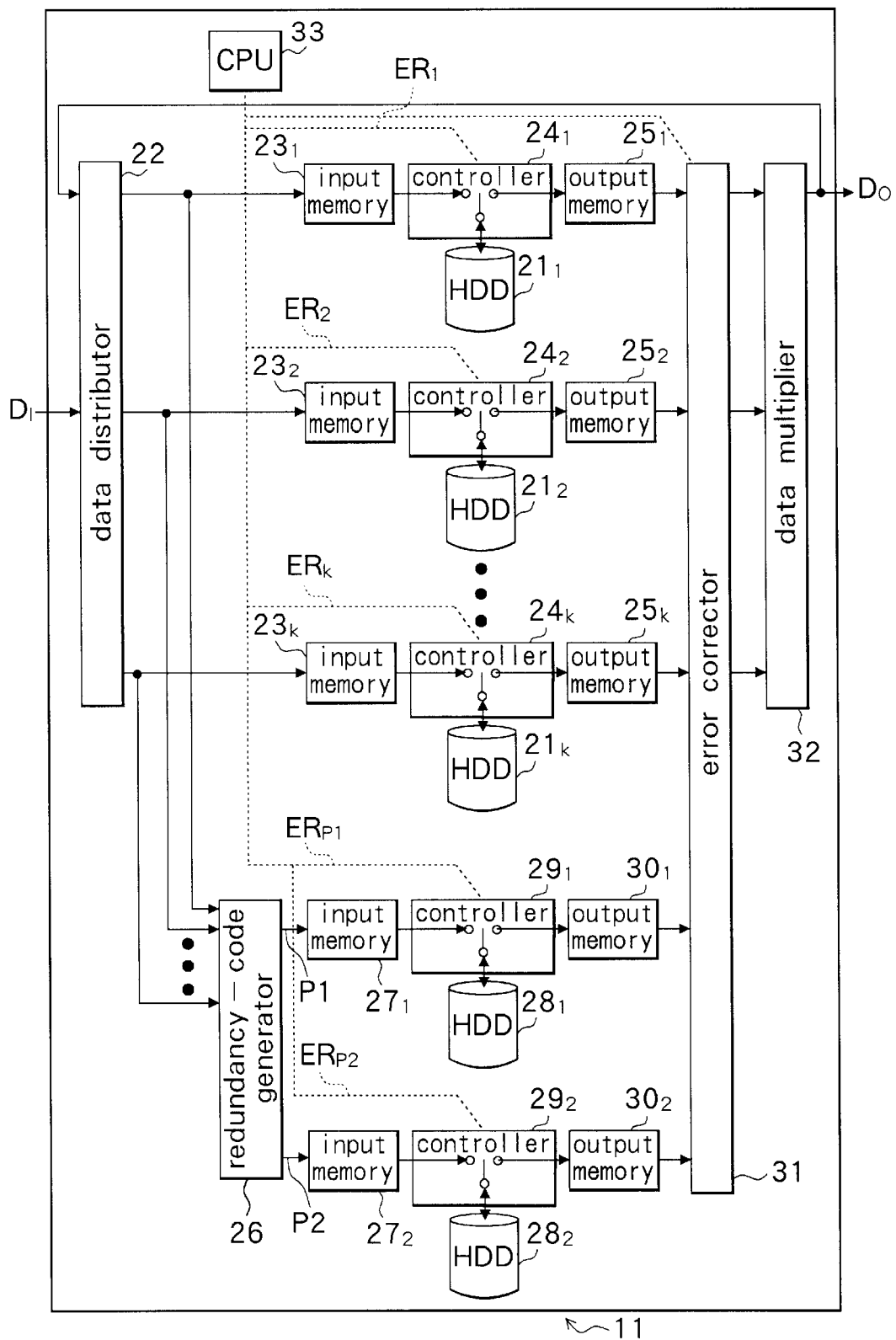
FIG. 2 is a block diagram showing the configuration of the data recording and reproducing apparatus according to an embodiment of the invention.

FIG. 2 is a block diagram showing the configuration of the data recording and reproducing apparatus according to the embodiment. The data recording and reproducing apparatus 11 (represents $11_1$ to $11_n$) comprises: a plurality of HDDs $21_1$ to $21_K$ (K is an integer of 2 or more) for recording input data; two HDDs $28_1$ and $28_2$ for recording the redundancy-code data as the error-correction-code data; a data distributor 22 for generating a plurality of divided data by dividing input data $D_I$ at a specific length and distributing the divided data to the HDDs $21_1$ to $21_K$; a redundancy-code generator 26 for generating and outputting redundancy-code data P1 and P2 from the divided data outputted from the data distributor 22; input memories $23_1$ to $23_K$ for temporarily keeping the divided data outputted from the data distributor 22; input memories $27_1$ and $27_2$ for temporarily keeping the redundancy-code data P1 and P2 outputted from the redundancy-code generator 26; controllers $24_1$ to $24_K$, $29_1$ and $29_2$, which are connected to the HDDs $21_1$ to $21_K$, 28 and $28_2$ respectively, for controlling recording (also referred as writing in the followings) the data kept by the $23_1$ to $23_K$, $27_1$ and $27_2$ on the HDDs $21_1$ to $21_K$, $28_1$ and $28_2$ and reproducing (also referred as reading out in the followings) the data from the HDDs $21_1$ to $21_K$, $28_1$ and $28_2$; output memories $25_1$ to $25_K$, $30_1$ and $30_2$ for temporarily keeping the data read out from the HDDs $21_1$ to $21_K$, $28_1$ and $28_2$ respectively; an error corrector 31 for restoring the divided data by performing error-detection and error-correction using the data kept by the output memories $25_1$ to $25_K$, $30_1$ and $30_2$ and error information which is described later; a data multiplier 32 for multiplying the output data of the error corrector 31 to output them as output data $D_O$; and a CPU 33 for controlling the whole apparatus. In addition, the output data of the data multiplier 32 may be inputted to the data distributor 22 under the control of the CPU 33. The CPU 33 includes ROM (Read-Only-Memory) in which the program is stored and RAM (Random-Access-Memory) as a working area.

The HDDs $21_1$ to $21_K$, $28_1$ and $28_2$ are made to perform data-recording operation or data-reproducing operation on/from the hard disk by accessing any recording region of the hard disk (magnetic disk) which is a random accessible recording medium. If a data-reading-out error occurs, the control section, which is not shown in figure, in the HDDs $21_1$ to $21_K$, $28_1$ and $28_2$ transmits the error information indicating the error to the controllers $24_1$ to $24_K$, $29_1$ and $29_2$ as status data. Furthermore, the error information is to be transmitted from the controllers $24_1$ to $24_K$, $29_1$ and $29_2$ to the CPU 33 as error information $ER_1$ to $ER_K$, $ER_{P1}$ and $ER_{P2}$.

Figure 8:
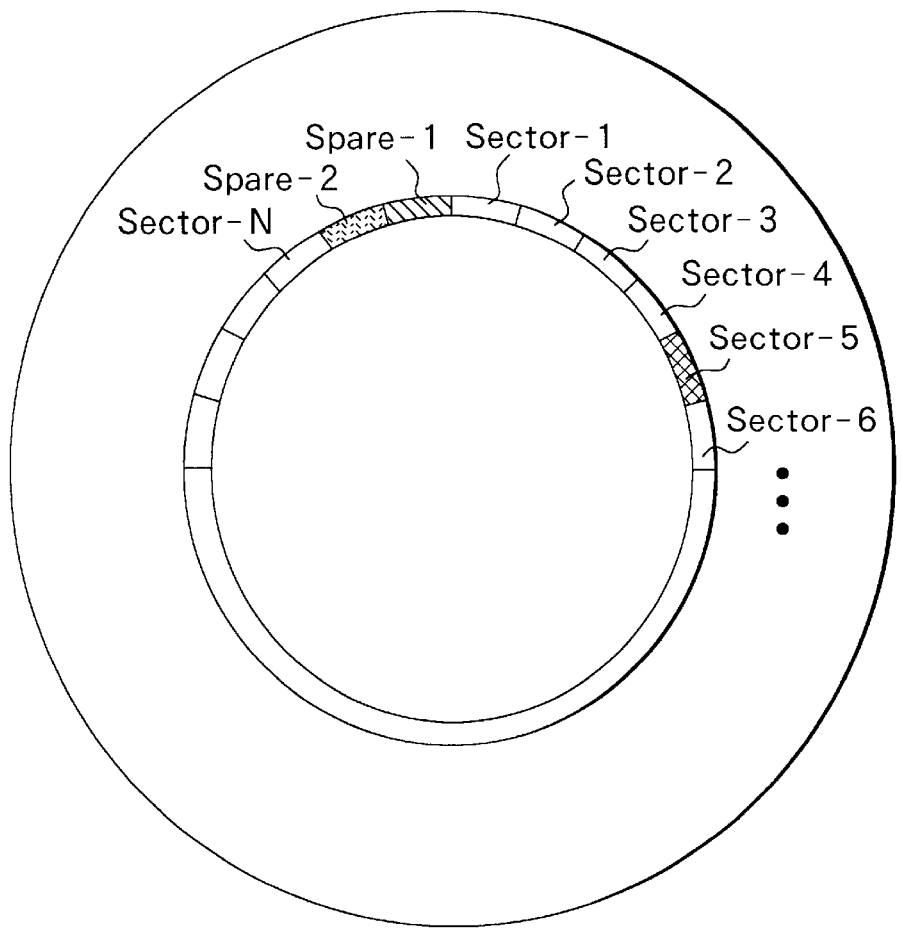
FIG. 8 is an explanatory figure for describing a format on a hard disk according to an embodiment of the invention.

Now, a format on a hard disk will be described with reference to FIG. 8. A plurality of tracks are provided on a hard disk in a concentric circular pattern. Only one track is shown in FIG. 8. A plurality of sectors, which are recording units of data, are provided by dividing the tracks in a radial pattern. There may be a case where these sectors include sectors in which errors always occur at the time of writing or reading out data. Such sectors are called defective sectors. Defective sectors are considered to be in a condition in which reading out or writing data can not be correctly performed because of physical damage or the like. In case that there should be defective sectors, spare sectors may be provided on the hard disk so that data can be recorded on the spare sectors instead of the defective sectors if necessary. Such a spare sector is called a substitute sector. In the HDD having substitute sectors, the control section in the HDD includes a correspondence table showing the correspondence between logical sector numbers (LBA) and physical sector numbers so that the substitute sectors used instead of the defective sectors can be referred by the same sector number as the defective sectors from the superior devices.

Figures 9A, 9B:
FIGS. 9A and 9B are explanatory figures for describing the correspondence between a logical address and a physical sector number.

In the example shown in FIG. 8, N number of sectors (Sector-1 to Sector N) are physically allotted to one track while two spare sectors (Spare sector Spare-1 and Spare-2) are further provided. FIG. 9 shows the correspondence between LBA and the physical sector number shown in the correspondence table mentioned above. In a normal case without a defective sector, LBA and the physical sector number are coincide with each other as shown in FIG. 9A. The control section in the HDD manages the recording region on the hard disk based on the correspondence according to the correspondence table shown in FIG. 9A in normal cases. In contrast, if there is a defect in the Sector Sector-5, the Spare sector Spare-1 is used instead of the Sector Sector-5. In such a case, as shown in FIG. 9B, the Spare sector Spare-1 is corresponded to the "5" in LBA, and the control section in the HDD is to manage the recording region on the hard disk based on the correspondence according to the correspondence table shown in FIG. 9B. Changing the correspondence between LBA and the physical sector number upon the defective sector being generated as described is called a re-allotting processing (Reassign).

The CPU 33 is made to receive a command from the input/output processor $13_j$ through the down data bus 16, and to control the HDDs $21_1$ to $21_K$, $28_1$ and $28_2$ by giving an order to the controllers $24_1$ to $24_K$, $29_1$ and $29_2$ respectively, according to the command. If a reading-out error has occurred, the CPU 33 is also made to transmit the error information indicating the error to the error corrector 31. The error information includes information that identifies the HDD in which the reading-out error has occurred.

The error corrector 31 is made to restore the divided data by performing error detection and error correction using the error information from the CPU 33 and the data kept by the output memories $25_1$ to $25_K$, $30_1$ and $30_2$ if necessary, and to output the divided data which have been restored to the data multiplier 32. The data multiplier 32 is made to rearrange the divided data outputted from the error corrector 31 in the original data line, and to output it as the output data $D_O$.

The HDDs $21_1$ to $21_K$ correspond to means for recording and reproducing divided data of the invention, the HDDs 283 and $28_2$ to means for recording and reproducing error-correcting-code data of the invention, the data distributor 22 to dividing means of the invention, the redundancy-code generator 26 to means for generating error-correcting-code data of he invention, the error corrector 31 to error-correcting means of the invention, and the data multiplier 32 to the multiplying means of the invention.

In the embodiment, a code which can correct the errors of a plurality of divided data is used as the error-correction code. One of such codes is the BCH code. In the embodiment, the Read-Solomon code, a kind of the BCH code, is especially used as the error-correction code. Now, the Read-Solomon code will be described.

First, in the Read-Solomon code, 1 byte, ie 8 bits, is treated as one number, and 256 numbers, 00h to FFh (h represents the hexadecimal number), are used. Regarding the four fundamental rules of arithmetic, an arithmetic rule, which is different from the one used for integers, is employed.

In the Read-Solomon code, a polynomial such as a code polynomial or a generating polynomial is used. For example, in a case where 2 bytes of parity bytes are used for 14 bytes of data bytes, 14 bytes of data bytes and 2 bytes of parity bytes totaling 16 bytes are processed all together. Therefore, 14 bytes of data bytes are respectively referred as $W_{15}$, $W_{14}$, ..., $W_2$, and 2 bytes of parity data are respectively referred as $W_1$, $W_0$. $W_i$ (i is integer between 0 and 15) is any number ranging from 00h to FFh with byte format.

The code polynomial W (X) is defined by the formula (1) in the following.

$$W(X)=W_{15} \times X^{15}+W_{14} \times X^{14}+ \ldots +W_2 \times X^2+W_1 \times X+W_0 \quad (1)$$

X is also any number ranging from 00h to FFh with byte format.

In W(X) of the formula (1), the value of $W_1 \times X+W_0$ can be obtained as the remainder of dividing $W_{15} \times X^{15}+W_{14} \times X^{14}+ \ldots +W_2 \times X^2$ by the generating polynomial G (X) represented by the formula (2).

$$G(X)=(X-02h) \times (X-01h) \quad (2)$$

Accordingly, the values of parity byte $W_1$ and $W_0$ are determined so that the formula (3) and the formula (4) become valid.

$$W(02h)=00h \quad (3)$$

$$W(01h)=00h \quad (4)$$

In coding of the Read-Solomon code, parity byte is calculated from data byte based on such a correlation.

Next, error correction in the Read-Solomon code will be described. First, if the data $V_{15}$, $V_{14}$, ..., $V_1$, $V_0$ corresponding to the data bytes $Wi_{15}$, $W_{14}$, $W_2$ and the parity bytes $W_1$, $W_0$ are read out from the HDD (15), HDD (14), ..., HDD (1), HDD (0) respectively, the reading-out data $V_i$ is represented by the formula (5) or (6) depending on the existence of errors in the reading-out data $V_i$. on the HDD (i). $E_i$ represents the magnitude of the error.

$$\text{HDD } (i) \text{ without error: } Vi=Wi \quad (5)$$

$$\text{HDD } (i) \text{ with error: } Vi=Wi+Ei \quad (6)$$

Next, in contrast with the code polynomial W (X), V (X) is defined by the formula (7).

$$V(X)=V_{15} \times X^{15}+V_{14} \times X^{14}+ \ldots +V_2 \times X^2+V_1 \times X+V_0 \quad (7)$$

Furthermore, values $S_1$ and $S_0$ called syndromes are defined by the formulas (8) and (9).

$$S_1=V(02h) \quad (8)$$

$$S_0=V(01h) \quad (9)$$

If there are no errors in the reading-out data of the HDDs, the syndromes are represented by the formulas (10) and (11), since V (X)=W (X).

$$S_1 = 00h \quad (10)$$

$$S_0 = 00h \quad (11)$$

Next, if no error information is reported by the HDD (i) even there is an error in the reading-out data of the HDD (i), the syndromes are represented by the formulas (12 and (13), since $V(X) = W(X) + E_i \times X^i$ based on the formulas (6) and (7).

$$S_1 = E_i \times 02h^i \quad (12)$$

$$S_0 = E_i \times 01h^i = E_i \quad (13)$$

Accordingly, the volume of the error $E_i$ is obtained by the formula (13) and the attached letter i that shows which HDD (i) includes the reading-out data with the error can be obtained by the magnitude of the error $E_i$ and the formula (12). This enables error correction of the reading-out, which is called one-error-correction.

Next, if there are errors in the reading-out data in two HDDs, HDD (i) and HDD (j), (j is an integer from 0 to 15) and error information is reported by the HDD (i) and the HDD (j), the syndromes are represented by the formulas (14) and (15), since $V(X) = W(X) + E_i \times X_i + E_j \times X_j$ based on the formulas (6) and (7).

$$S_1 = E_i \times 02h^i + E_j \times 02h^j \quad (14)$$

$$S_0 = E_i \times 01h^i + E_j \times 01h^j = E_i + E_j \quad (15)$$

In this case, the values of the attached letters i and j are already known since it is assumed that there are reports of error information from the HDD (i) and the HDD (j). Accordingly, the values of $02h^i$ and $02h^j$ in the formula (14) can be calculated and the values of $E_i$ and $E_j$ can be obtained by a simultaneous equation with two unknowns. This enables error correction of the reading-out data, which is called two-error-loss-correction.

In decoding of the Read-Solomon code, the values of the syndromes are obtained as described, and the location and the volume of the error are obtained using the value of the syndromes.

The data bytes $W_{15}$, $W_{14}$, ..., $W_2$ correspond to the divided data of the embodiment, and the parity bytes $W_1$ and $W_0$ correspond to the redundancy-code data P1 and P2 of the embodiment.

Next, the operation of the data recording and reproducing apparatus 11 according to the embodiment will be described. The description in the following includes the description of the method for recording and reproducing data according to the embodiment.

First, the data-writing operation of the data recording and reproducing apparatus 11 will be described. The input data $D_I$ is inputted to the data distributor 22 to generate a plurality of divided data. The divided data is distributed to the input memories $23_1$ to $23_K$ and temporarily recorded in the input memories $23_1$ to $23_K$ while being inputted to the redundancy-code generator 26. At this time, data may be distributed in order as follows: provided that, for example, the data are arranged in data lines D1, D2, D3, D4, D5, ..., with a unit of bit or byte, the data D1 is distributed to the first HDD $21_1$ the data D2 is distributed to the second HDD $21_2$, and so forth, and if the data DK is distributed to the last HDD $21_K$, data is distributed in order to the HDDs beginning at the first HDD $21_1$ again.

The redundancy-code generator 26 generates the redundancy-code data P1 and P2 of the Read-Solomon code based on the divided data outputted from the data distributor 22, and outputs them. The input memories $27_1$ and $27_2$ temporarily record the redundancy-code data P1 and P2. After that, the controllers $24_1$ to $24_K$, $29_1$ and $29_2$ of the respective HDDs $21_1$ to $21_K$, $28_1$ and $28_2$ read out the divided data and the redundancy-code data P1 and P2 from the input memories $23_1$ to $23_K$, $27_1$ and $27_2$ and write them onto the HDDs $21_1$ to $21_K$, $28_1$ and $28_2$ respectively under the control of the CPU 33.

Next, the data-reading-out operation of the data recording and reproducing apparatus 11 will be described. The controllers $24_1$ to $24_K$, $29_1$ and $29_2$ read out the divided data and the redundancy-code data P1 and P2 from the respective HDDs $21_1$ to $21_K$, $28_1$ and $28_2$ and write them onto the output memories $25_1$ to $25_K$, $30_1$ and $30_2$ respectively under the control of the CPU 33. At this time, if an reading-out error occurs in the HDDs $21_1$ to $21_K$, $28_1$ and $28_2$, error information indicating that an error has occurred is sent to the controllers $24_1$ to $24_K$, $29_1$ and $29_2$ as status data from the control section in the HDDs $21_1$ to $21_K$, $28_1$ and $28_2$. Then, the error information is sent to the CPU 33 as error information $ER_1$ to $Er_K$, $Er_{P1}$ and $ER_{P2}$ from the controllers $24_1$ to $24_K$, $29_1$ and $29_2$.

Each of the data recorded on the output memories $25_1$ to $25_K$, $30_1$ and $30_2$ is synchronized and outputted to the error corrector 31. At this time, if the reading-out error occurs, error information indicating that an error has occurred is sent to the error corrector 31 from the CPU 33. The error information includes information for identifying the HDD in which the reading-out error has occurred. The error corrector 31 restores the divided data based on the error information and the redundancy-code data P1 and P2 if necessary, and outputs them to the data multiplier 32. The data multiplier 32 rearranges the divided data outputted from the error corrector 31 in the original data line and outputs it outside as the output data $D_O$.

In the embodiment, the Read-Solomon code, which can correct errors of a plurality of divided data, is used as the error-correction code so that restoring the divided data is possible in the following cases.

(1) if there is an error in the reading-out data in one HDD

Restoring divided data is possible not only in the case where error information that the reading-out error has occurred in the HDD is reported, but also in the case where no error information is reported.

(2) if there are errors in the reading-out data in two HDDs and error information that reading-out errors occurred in those HDDs is reported In the meantime, if an error (referred as writing error in the followings) in an writing operation occurs in any of the HDDs, it is necessary to restore the data in which the writing error has occurred. This data-restoring processing performed on part of the recording region of the recording medium (hard disk) is called a portion-rebuild processing (Portion Rebuild) in the embodiment. In addition, if there is a defective sector where errors always occur in the writing operation or the reading-out operation, the re-allotting processing (Reassign) in which the correspondence between LBA and the physical sector number is changed is necessary as described. Furthermore, if any of the HDDs in the data recording and reproducing apparatus is replaced, it is necessary to rebuild the original data on the new HDD. This data-restoring processing performed on the whole recording region of the recording medium (hard disk) is called a whole-rebuild processing (Whole Rebuild) in the embodiment.

In the followings, an example of the total operation of the data recording and reproducing apparatus 11 including the Portion Rebuild, the Reassign and the Whole Rebuild mentioned above will be described. In the following example, there are three operation modes of the data recording and reproducing apparatus 11: the regular mode, the Reassign mode, and the Whole-Rebuild. The transition from the regular mode to the Reassign mode occurs if predetermined conditions are fulfilled in the regular mode or if the data recording and reproducing apparatus 11 receives a command from the superior device, that is, the input/output processor section 12 in FIG. 1. If the processing of the Reassign is completed, the transition from the Reassign mode to the regular mode occurs. The transition from the regular mode to the Whole-Rebuild mode occurs if the data recording and reproducing apparatus 11 receives a command from the superior device, that is, the input/output processor section 12 in FIG. 1, or if the data recording and reproducing apparatus 11 itself detects that any of the HDDs has been replaced. If the processing of the Whole-Rebuild mode is completed, the transition from the Whole-Rebuild mode to the regular mode occurs.

Figure 3:
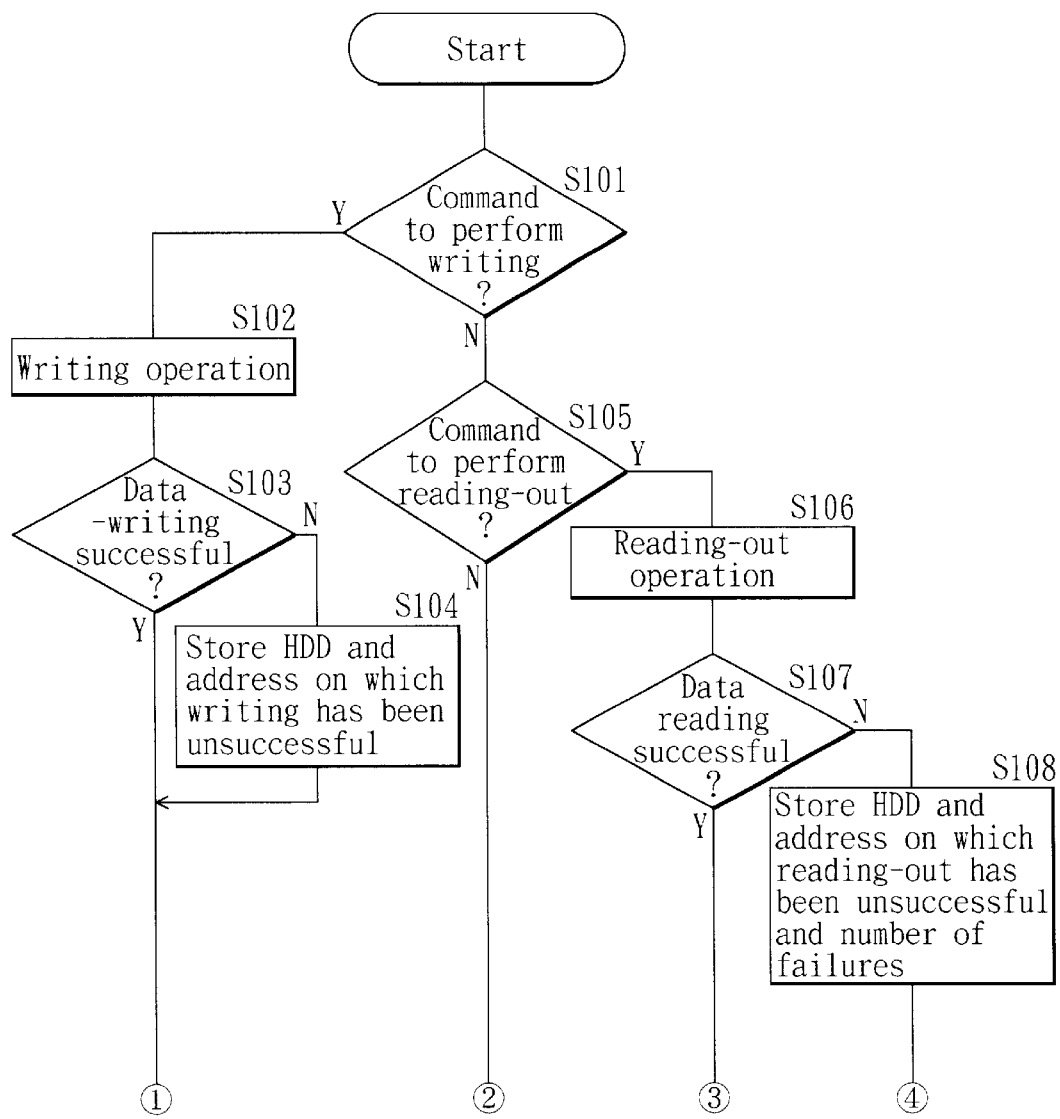
FIG. 3 is a flow chart showing the operation of the data recording and reproducing apparatus according to an embodiment of the invention in one time slot in the regular mode.
Figure 4:
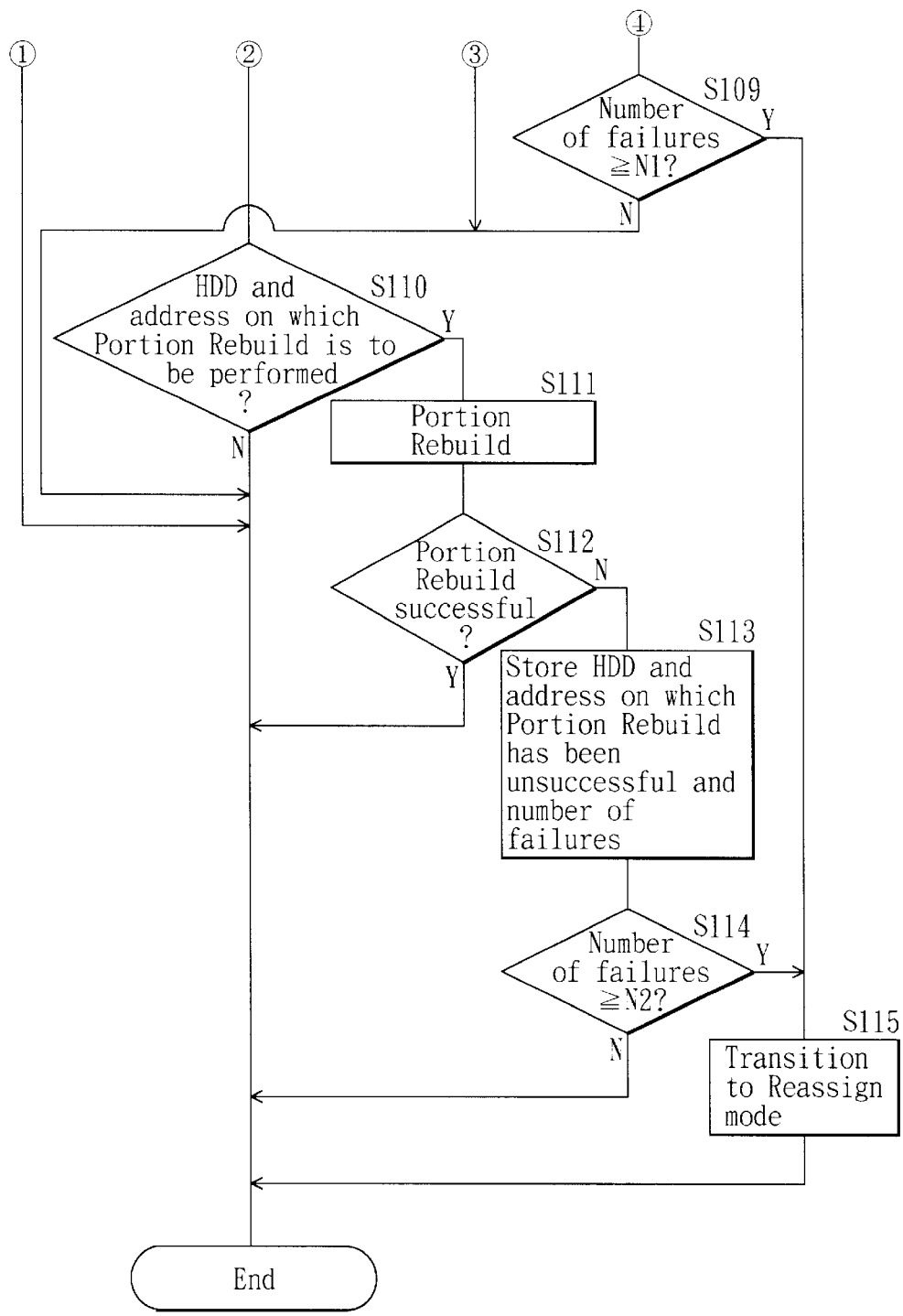
FIG. 4 is a flow chart following FIG. 3.

FIG. 3 and FIG. 4 are flow charts showing the operation of the data recording and reproducing apparatus 11 in one time slot of the regular mode. In this operation, first, the CPU 33 determines whether the CPU 33 itself has received a command to perform writing or not (step S101), and if it has received the command to perform writing (step S101; Y), the CPU 33 performs the above-mentioned writing operation (step S102). The CPU 33 can determine whether it has received the command to perform writing or not by, for example, determining whether the command transferred from the input/output processors $13_1$ to $13_6$ through the bus 16 is the one to perform writing or not upon receiving the command. After the writing operation is completed, the CPU33 determines whether the data-writing has been successful or not (step S103) based on the information from the respective HDDs $21_1$ to $21_K$, $28_1$ and $28_2$. If the data-writing has been successful (step S103; Y), the operation in one time slot is ended. If the data-writing has been unsuccessful (step S103; N), the CPU 33 stores the HDD and the address on which writing has been unsuccessful (step S104) and ends the operation in one time slot.

If the CPU 33 has not received a command to perform writing (step S 101;N), the CPU 33 determines whether the CPU 33 itself has received a command to perform reading-out (step S105). If the CPU 33 has received a command to perform and perform reading-out (step 105; Y), the CPU 33 performs the above-mentioned reading-out operation (step S106). The CPU 33 can determine whether it has received the command to perform reading-out or not by determining whether the command transferred from the input/output processors $13_1$ to $13_6$ through the bus 16 is the command to perform reading-out or not. After the reading-out operation is completed, the CPU 33 determines whether the data-reading-out has been successful or not (step S107) based on existence of the error information $ER_1$ to $ER_K$, $ER_{P1}$ and $ER_{P2}$ from the respective HDDs $21_1$ to $21_K$, $28_1$ and $28_2$. If the data-reading-out has been successful (step S107; Y), the operation in one time slot is ended. If the data-reading-out has been unsuccessful (step S107; N), the CPU 33 stores the HDD and the address on which reading-out has been unsuccessful, and the number of the failures in reading-out in the HDD and the address (step S108). Next, the CPU 33 determines whether the number of the failures stored in the step S108 is equal to or more than the predetermined value N1 (N1 is any integer of 1 or more) or not (step S109). If the number of the failures in reading-out is less than the predetermined value N1 (step S109; N), the operation in one time slot is completed. If the number of the failures in reading-out is equal to or more than the predetermined value N1 (step S109; Y), the CPU 33 changes the operation mode to the Reassign mode which is to be described later (step S115).

If neither the command to perform writing nor the command to perform reading-out has been received by the CPU 33(step S105; N), the CPU 33 determines whether there are a HDD and an address on which the Portion Rebuild is to be performed or not (step S110). There are three kinds of HDDs and addresses on which the Portion Rebuild is to be performed. The first ones are the HDD and the address stored in the step S104 in which writing has been unsuccessful. The second ones are the HDD and the address on which the Reassign has been performed. The third ones are the HDD and the address stored during the suspension of the writing operation in the process of the Reassign, and will be described in detail later. The HDD and the address on which the Portion Rebuild is to be performed are stored by the CPU 33. However, the HDD and the address on which the Portion Rebuild is to be performed may be stored by the superior device of the data recording and reproducing apparatus 11 that is, the input/output processor section 12 shown in FIG. 1. Incidentally, if neither command to perform writing (step S101; N) nor command to perform reading-out (step S105; N) is received, no command to operate is received from the superior processor, ie the input/output processor section 12. In other words, the superior processor, ie the input/output processor section 12 operates in the allotted time slot if the command to perform writing or the command to perform reading-out is received from the superior device. If no such command is received, the operation in the allotted time slot has completed.

If there is no HDD and address on which the Portion Rebuild is to be performed (step S110; N), the CPU 33 ends the processing. If there are the HDD and the address on which the Portion Rebuild is to be performed (step S110; Y), the CPU 33 performs the Portion Rebuild (step S111). The Portion Rebuild will be described in detail later.

The CPU 33 determines whether the Portion Rebuild has been successful or not (step S112) after completing the Portion Rebuild. If the Portion Rebuild has been successful (step S112; Y), the CPU 33 ends the processing operation. If the Portion Rebuild has been unsuccessful (step S112; N), the CPU 33 stores the HDD and the address on which the Portion Rebuild has been unsuccessful, and the number of the failures in the Portion Rebuild in the HDD and the address (step S113). Next, the CPU 33 determines whether the number of the failures stored in the step 113 is equal to or more than the predetermined value N2 (N2 is any integer of 1 or more) or not (step S114). If the number of the failures in the Portion Rebuild is less than the predetermined value N2 (step S114; N), the operation in one time slot is ended. If the number of the failures in the Portion Rebuild is equal to or more than the predetermined value N2 (step S114; Y), the CPU 33 changes the operation mode to the Reassign mode (step S115).

As described, in the embodiment, the Portion Rebuild is performed in a time slot if no command to perform writing or reading-out is received from the superior device. In other words, in the spare time for operation, without interrupting the writing operation of the data transferred from the superior device, or the reading-out operation of the recorded data which is to be outputted to the superior device.

Figure 5:
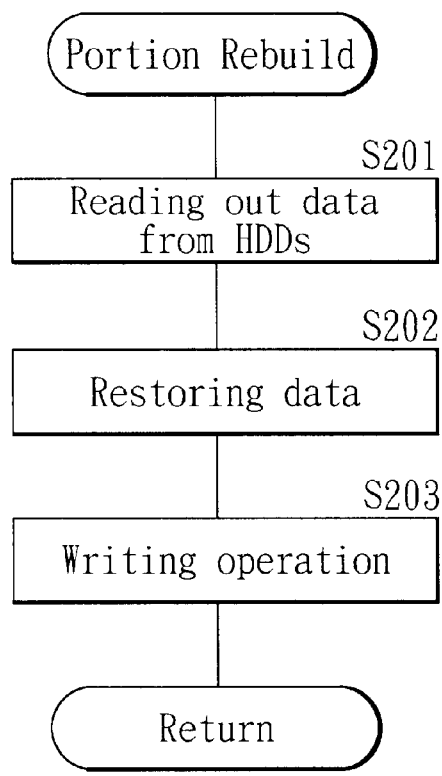
FIG. 5 is a flow chart showing the operation of a portion-rebuild-processing in FIG. 4.

Next, the Portion Rebuild (step S111) will be described in detail with reference to the flow chart shown in FIG. 5. The Portion Rebuild is performed sector by sector. In the Portion Rebuild, first, the CPU 33 makes the controllers $24_1$ to $24_K$, $29_1$ and $29_2$ perform the reading-out operation by appointing the address (sector) on which the Portion Rebuild is performed. In response, the controllers $24_1$ to $24_K$, $29_1$ and $29_2$ read out the data in the appointed address from the HDDs $21_1$ to $21_K$, $28_1$ and $28_2$ respectively (step S201). The read-out data is inputted to the error corrector 31 through the output memories $25_1$ to $25_K$, $30_1$ and $30_2$. At this time, the CPU 33 gives a command for the error corrector 31 not to use the data read out from the HDD on which the Portion Rebuild is to be performed. The error corrector 31 restores portion of data (step S202) using the data outputted from the output memories $25_1$ to $25_K$, $30_1$ and $30_2$ except the data read out from the HDD on which the Portion Rebuild is to be performed, and outputs the portion of data which has been restored to the data multiplier 32. The data multiplier 32 rearranges the divided data outputted from the error corrector 31 in the original data line and outputs it as the output data $D_O$.

Next, under the control of the CPU 33, the output data $D_O$ from the data multiplier 32 is inputted to the data distributor 22. The portion of data which has been restored is written on the HDD on which the Portion Rebuild is to be performed (step S203) by performing the same writing operation as that of the input data $D_I$, and then the Portion Rebuild is ended. In addition, in the writing operation, data-writing may be performed only on the HDD on which the Portion Rebuild is to be performed. To make the writing operation easier, however, data-writing may be performed on all of the HDDs $21_1$ to $21_K$, $28_1$ and $28_2$.

In the embodiment, Read-Solomon code, which can perform error-correction on a plurality of the divided data, is used as the error-correction code so that the ability to detect and correct the error of the data equal to the data recording and reproducing apparatus using the RAID-3 can be maintained even during the Portion Rebuild. In other words, data can be correctly restored even if a reading-out error occurs during the Portion Rebuild in one of other HDDs than the HDD on which the Portion Rebuild is being performed.

In the above description of the Portion Rebuild, the output data $D_O$ is transmitted from the data multiplier 32 to the data distributor 22, and then the writing operation is performed. The writing operation, however, may be performed after transmitting the divided data outputted from the error corrector 31 to the input memories $23_1$ to $23_K$ and the redundancy-code generator 26.

Furthermore, in the above description, the CPU 33 detects and records the HDD and the address on which the Portion Rebuild is to be performed. However, the CPU 33 may be substituted by the superior device to the data recording and reproducing apparatus 11. Specifically, the superior device, that is, the input/output processor section 12 shown in FIG. 1, stores the HDD and the address on which the Portion Rebuild is to be performed, and gives a command for the data recording and reproducing apparatus 11 to perform the Portion Rebuild by appointing the HDD and the address on which the Portion Rebuild is to be performed. The data recording and reproducing apparatus 11 performs the Portion Rebuild upon receiving the command. Also in such a case, the Portion Rebuild is made to be performed in the time slot in which no command to perform writing or reading-out is received.

Figure 6:
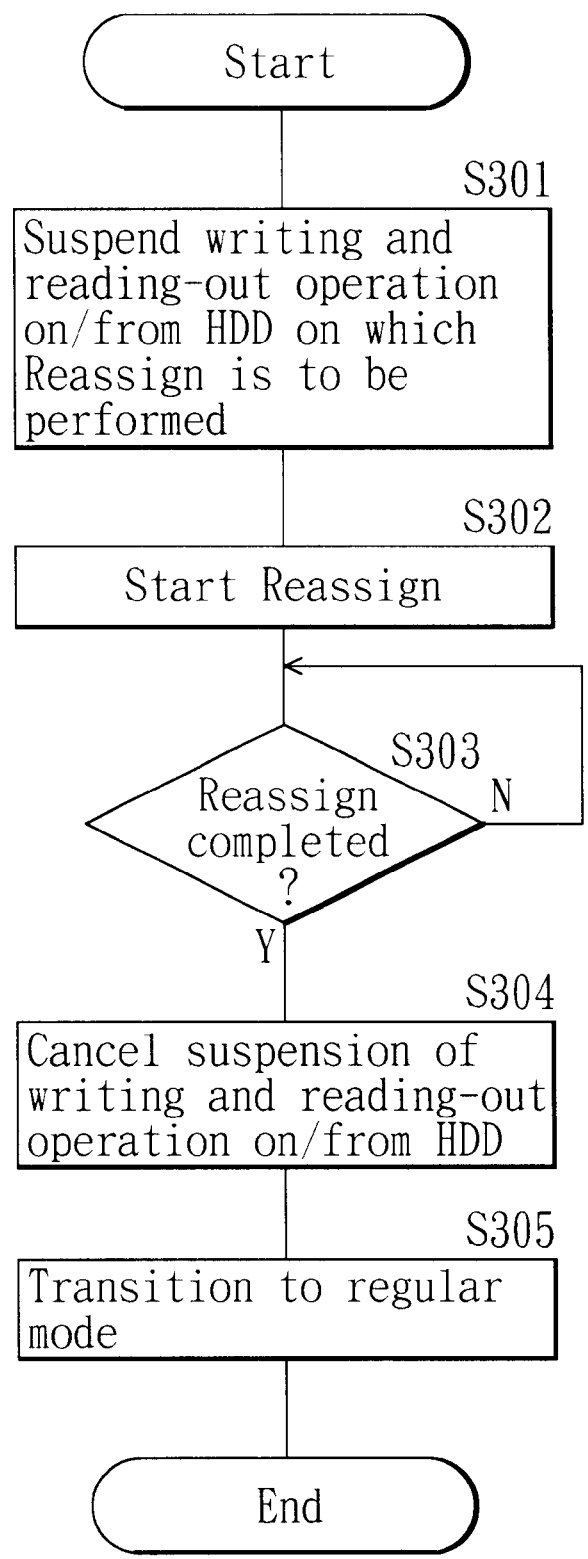
FIG. 6 is a flow chart showing the operation of the data recording and reproducing apparatus according to an embodiment of the invention in the re-allotting processing mode.

Next, the operation during the Reassign will be described with reference to the flow chart shown in FIG. 6. The transition from the regular mode to the Reassign mode occurs if predetermined conditions are fulfilled in the regular mode shown in FIG. 3 and FIG. 4 (step S115) or if a command is received from the superior device to the data recording and reproducing apparatus $11_1$ which is the input/output processor section 12 shown in FIG. 1.

In the operation of the Reassign, first, the CPU 33 suspends the writing operation and the reading-out operation on/from the HDD on which the Reassign is to be performed (step S301). Next, the CPU 33 makes the Reassign be started on the HDD (step S302) on which the Reassign is to be performed, appointing the sector on which the Reassign is to be performed. The sector on which the Reassign is to be performed refers to a sector in which the number of the failures in reading-out has become equal to or more than Ni and a sector in which the number of the failures in the Portion Rebuild has become equal to or more than N2. The Reassign is, as described, to change the correspondence between LBA and the physical sector number. If the CPU 33 receives a command to perform writing, during the Reassign, it makes the writing operation be performed on the HDDs except the HDD on which the Reassign is to be performed while storing the HDD on which the Reassign is to be performed and LBA onto which writing is to be performed according to the command. If the CPU 33 receives a command to perform reading-out, during the Reassign, it makes the reading-out operation be performed on the HDDs except the HDD on which the Reassign is to be performed, and gives a command for the error corrector 31 to perform the error correction voiding the data from the HDD on which the Reassign is to be performed.

Next, the CPU 33 determines whether the Reassign is completed or not (step S303). If it is not completed (step S303; N), the determining process is repeated. If the Reassign is completed (step S303; Y), the CPU 33 cancels the suspension of the writing operation and the reading-out operation on/from the HDD on which the Reassign is to be performed (step S304), and changes the operation mode to the regular mode (step S305).

As described, in the embodiment, the writing operation and the reading-out operation are carried out without being interrupted even during the Reassign. In addition, in the embodiment, the Read-Solomon code, which can correct errors of a plurality of divided data, is used as the error-correction code so that the ability to detect and correct the error of the data equal to the data recording and reproducing apparatus using the RAID-3 can be maintained even during the Reassign. In other words, data can be correctly restored even if a reading-out error occurs in the reading-out operation during the Reassign in one of other HDDs than the HDD on which the Reassign is being performed.

Next, the Whole Rebuild will be described. The Whole Rebuild is carried out if any of the HDD is replaced. The transition from the regular mode to the Whole Rebuild mode occurs if a command is received from the superior device to the data recording and reproducing apparatus 11 that is, the input/output processor section 12 shown in FIG. 1, or if the data recording and reproducing apparatus 11 itself detects the fact that any of the HDDs has been replaced. The command from the input/output processor section 12 includes information for identifying the HDD on which the Reassign is to be performed. The data recording and reproducing apparatus 11 itself detects that any of the HDD has been replaced in the following manner: first, the detecting operation is performed by the CPU 33 if the data recording and reproducing apparatus 11 is started or if a HDD is taken in and out; the controllers $24_1$ to $24_K$, $29_1$ and $29_2$ detect that a HDD has been taken in and out, and transmit the information to the CPU 33; it is determined whether the HDD is replaced or not using the serial numbers of the HDD detected by the controllers $24_1$ to $24_K$, $29_1$ and $29_2$, or the characteristic information of the HDD which has been recorded in advance on a predetermined region of the HDD.

Figure 7:
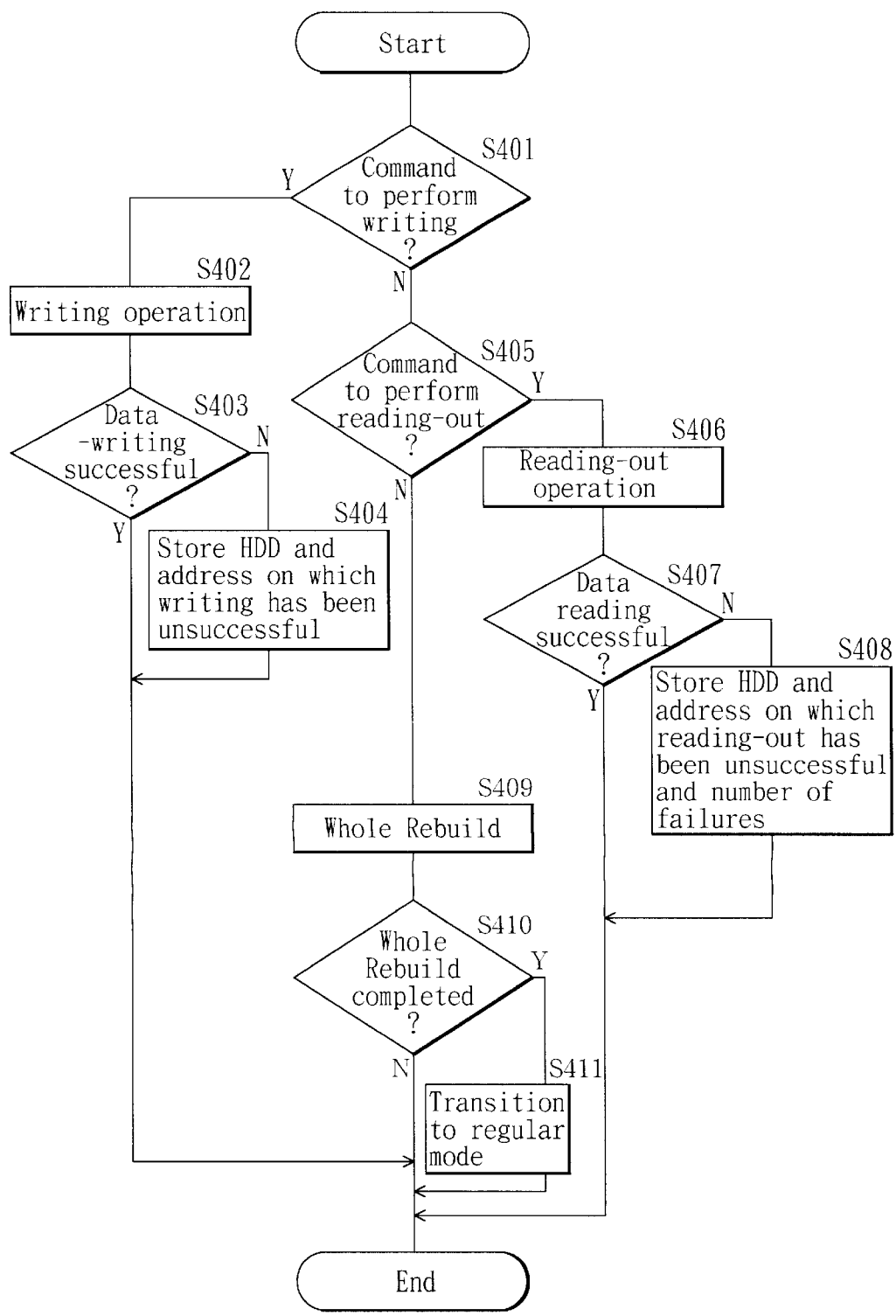
FIG. 7 is a flow chart showing the operation of the data recording and reproducing apparatus according to an embodiment of the invention in one time slot in the whole-rebuild-processing mode.

Next, the operation in one time slot during the Reassign mode will be described with reference to the flow chart shown in FIG. 7. In the operation, first, the CPU 33 determines whether the command to perform writing has been received or not (step S401). If the command to perform writing has been received (step S401; Y), the CPU 33 performs the writing operation (step S402). The writing operation at this time is the same as that of the regular mode. After the writing operation is completed, the CPU 33 determines whether the data-writing has been successful or not (step S403) based on the information from the HDDs $21_1$ to $21_K$, $28_1$ and $28_2$. If the data-writing has been successful (step S403; Y), the operation in one time slot is ended. If the data-writing has been unsuccessful (step S403; N), the CPU 33 stores the HDD and the address in which writing has been unsuccessful (step S404), and ends the operation in one time slot.

If the CPU 33 has not received a command to perform writing (step S401; N), the CPU 33 determines whether the CPU 33 has received the command to perform reading-out or not (step S405). If the CPU 33 has received a command to perform writing (step S401; Y), the CPU 33 performs the reading-out operation (step S406). In the reading-out operation at this time, however, the CPU 33 gives a command for the error corrector 31 not to use the data read out from the HDD on which the Whole Rebuild is to be performed. The error corrector 31 restores portion of data using the data outputted from the output memories $25_1$ to $25_K$, $30_1$ and $30_2$ except the data read out from the HDD on which the Whole Rebuild is to be performed, and outputs the portion of data which has been restored to the data multiplier 32. After the reading-out operation is completed, the CPU 33 determines whether the data-reading-out has been successful or not (step S407) based on the existence of the error information $ER_1$ to $ER_K$, $ER_{P1}$ and $ER_{P2}$. If the data-reading-out has been successful (step 407; Y), the operation in one time slot is ended. If the data-writing has been unsuccessful (step S407; N), the CPU 33 stores the HDD and the address on which reading-out has been unsuccessful (step S408), and ends the operation in one time slot.

Neither command to perform writing nor command to perform reading-out has been received by the CPU 33 (step S405; N), the CPU 33 performs the Whole Rebuild (step S409). The Whole Rebuild is to perform the same processing as the Portion Rebuild on the whole recording region of the hard disk. Next, the CPU 33 determines whether the Whole Rebuild has been totally completed or not (step S410). If the Whole Rebuild has not been completed (step S410; N), the operation in one time slot is ended. If the Whole Rebuild has been completed (step S410; Y), the CPU 33 changes the operation mode to the regular mode (step S411).

In the embodiment as described, the Whole Rebuild is carried out in the time slot if no command to perform writing or reading-out is given, without interrupting the writing operation or the reading-out operation.

In addition, in the embodiment, the Read-Solomon code, which can perform error-correction on a plurality of the divided data, is used as the error-correction code so that the ability to detect and correct the error of the data equal to the data recording and reproducing apparatus using the RAID-3 can be maintained even during the Whole Rebuild mode. In other words, data can be correctly restored even if a reading-out error occurs during the Whole Rebuild in one of other HDDs than the HDD on which the Whole Rebuild is to be performed. Data can also be correctly restored even if a reading-out error occurs in the reading-out operation during the Whole Rebuild mode in one of other HDDs than the HDD on which the Whole Rebuild is to be performed.

In addition, in the Whole Rebuild, data-writing may be performed only on the HDD on which the Portion Rebuild is to be performed. To make the writing operation easier, however, data-writing may be performed on all of the HDDs $21_1$ to $21_K$, $28_1$ and $28_2$, like the Portion Rebuild.

In the above description of the Whole Rebuild, the output data $D_O$ is transmitted from the data multiplier 32 to the data distributor 22, and then the writing operation is performed. The writing operation, however, may be performed after transmitting the divided data outputted from the error corrector 31 to the input memories $23_1$ to $23_K$ and the redundancy-code generator 26.

As described, the data recording and reproducing apparatus 11 according to the embodiment is made to generate a plurality of divided data by dividing input data by a predetermined unit and the error-correction-code data (redundancy-code data P1, P2) for the input data using the correction-code data (Read-Solomon code) which can correct errors of a plurality of divided data based on the input data, and to record the divided data and the error-correction-code data on the HDDs $21_1$ to $21_K$, $28_1$ and $28_2$ respectively at the time of recording data. It is also made to reproduce the divided data and the error-correction-code data from the HDDs $21_1$ to $21_K$, $28_1$ and $28_2$, to perform the error-correction processing on the divided data which has been reproduced using the error-correction-code data which has been reproduced to multiply the divided data on which the error-correction processing has been performed, and output them. Accordingly, the data recording and reproducing apparatus 11 according to the embodiment has a better ability in detecting and correcting errors of data compared to the data recording and reproducing apparatus using the RAID-3 or the RAID-5, and the reliability of the system is greatly improved. Besides, the data recording and reproducing apparatus 11, like the data recording and reproducing apparatus using the RAID-3, can perform writing input data by one access, and can immediately perform error correction after reading out data. As a result, it is suitable for processing which requires a real-time operation and for a device such as a multi-channel video server which requires a real-time operation.

Specifically, in the data recording and reproducing apparatus 11 according to the embodiment, the redundancy-code data P1 and P2 which can correct errors in two divided data are made to be generated so that the ability to detect and correct errors of data equal to the data recording and reproducing apparatus using the RAID-3 can be maintained even if one of the HDDs breaks down. In addition, if there is no read-out error and one of the HDDs reads out invalid data, it is possible to detect the invalid data and to restore the data. Furthermore, if two of the HDDs read out invalid data, data can be restored if the read-out error in each of the HDDs is detected.

Moreover, with the data recording and reproducing apparatus 11 according to the embodiment, the ability to detect and correct errors of data equal to the data recording and reproducing apparatus using the RAID-3 can be maintained even during the Portion Rebuild so that the reliability of the system can be improved and the maintenance of the apparatus becomes easier.

In addition, with the data recording and reproducing apparatus 11 according to the embodiment, the Portion Rebuild can be performed while a device which requires the real-time operation such as a multi-channel video server is being operated since the Portion Rebuild is carried out in the time slot if no command to perform writing or reading-out is given.

Further, with the data recording and reproducing apparatus 11 according to the embodiment, the ability to detect and correct errors of data equal to the data recording and reproducing apparatus using the RAID-3 can be maintained even during the Whole Rebuild so that the reliability of the system can be improved and the maintenance of the apparatus becomes easier.

Further, with the data recording and reproducing apparatus 11 according to the embodiment, the Whole Rebuild can be performed while a device which requires the real-time operation such as a multi-channel video server is being operated since the Whole Rebuild is carried out in the time slot if no command to perform writing or reading-out is given.

Further, with the data recording and reproducing apparatus 11 according to the embodiment, the Reassign can be performed while a device which requires the real-time operation such as a multi-channel video server is being operated since the writing operation or the reading-out operation is made to be carried out without being interrupted even during the Reassign.

Further, with the data recording and reproducing apparatus 11 according to the embodiment, the ability to detect and correct errors of data equal to the data recording and reproducing apparatus using the RAID-3 can be maintained even during the Reassign so that the reliability of the system can be improved and the maintenance of the apparatus becomes easier.

At last, an example of the result of the comparison of the reliability of the data recording and reproducing apparatus according to the embodiment and that of the data recording and reproducing apparatus using the RAID-3 will be described with reference to FIG. 10. In this example, the data recording and reproducing apparatus according to the embodiment has a configuration comprising fourteen HDDs for recording divided data and two HDDs for recording the redundancy-code data using the Read-Solomon code. In contrast, the data recording and reproducing apparatus using the RAID-3 has a configuration comprising two pairs of the combination of seven HDDs for recording divided data and one HDD for recording parity data. In this example, both the data recording and reproducing apparatus according to the embodiment and the data recording and reproducing apparatus using the RAID-3 use sixteen HDDs, which means that they have the same capacity of hard wares, and their redundancy are both one eighth.

Figure 10:
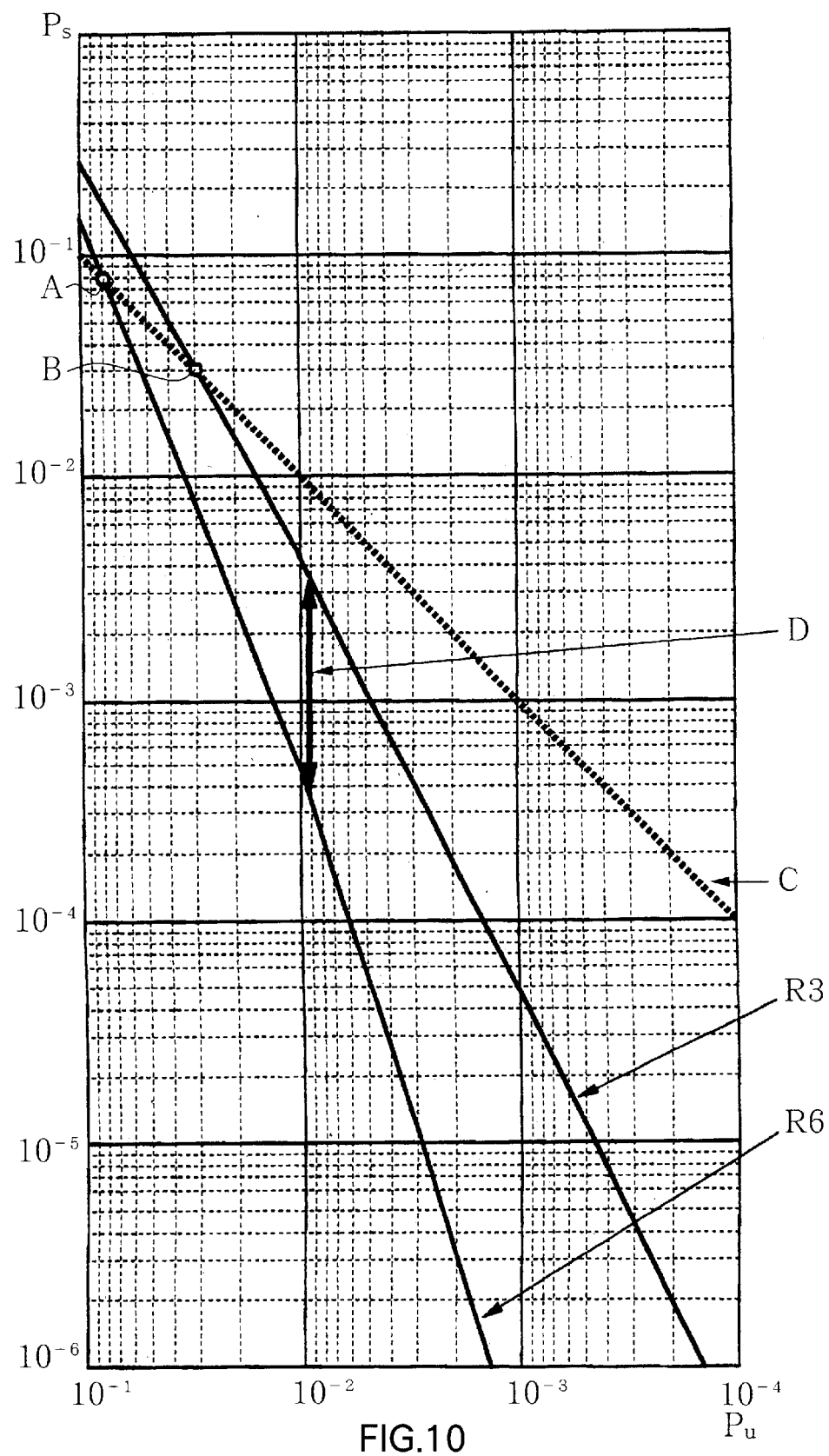
FIG. 10 is a characteristic figure showing an example of the result of comparing the reliability of the data recording and reproducing apparatus according to an embodiment of the invention to that of the data recording and reproducing apparatus using the RAID-3.
Figure 11:
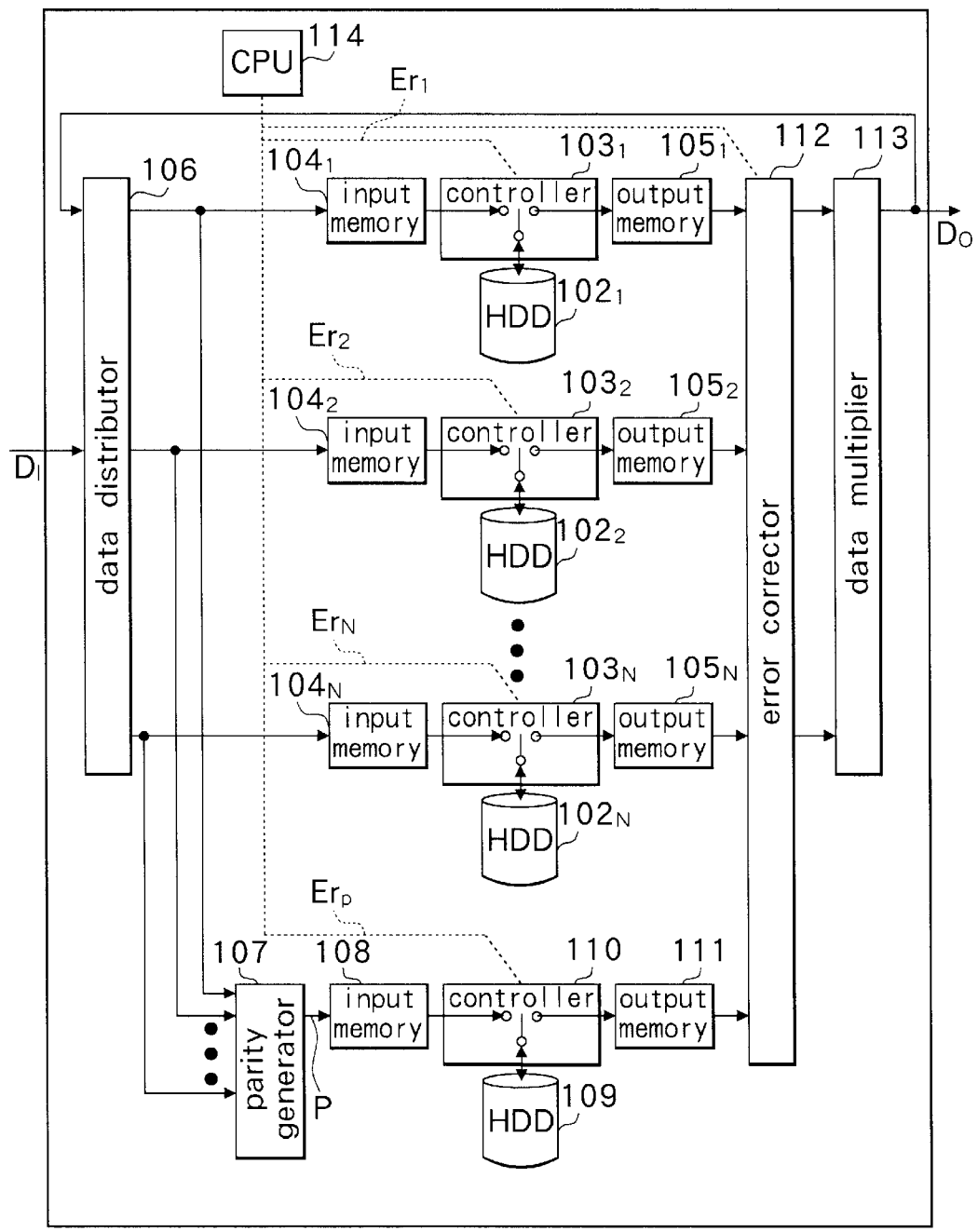
FIG. 11 is a block diagram showing a configuration example of the data recording and reproducing apparatus using the RAID-3.
Figure 12:
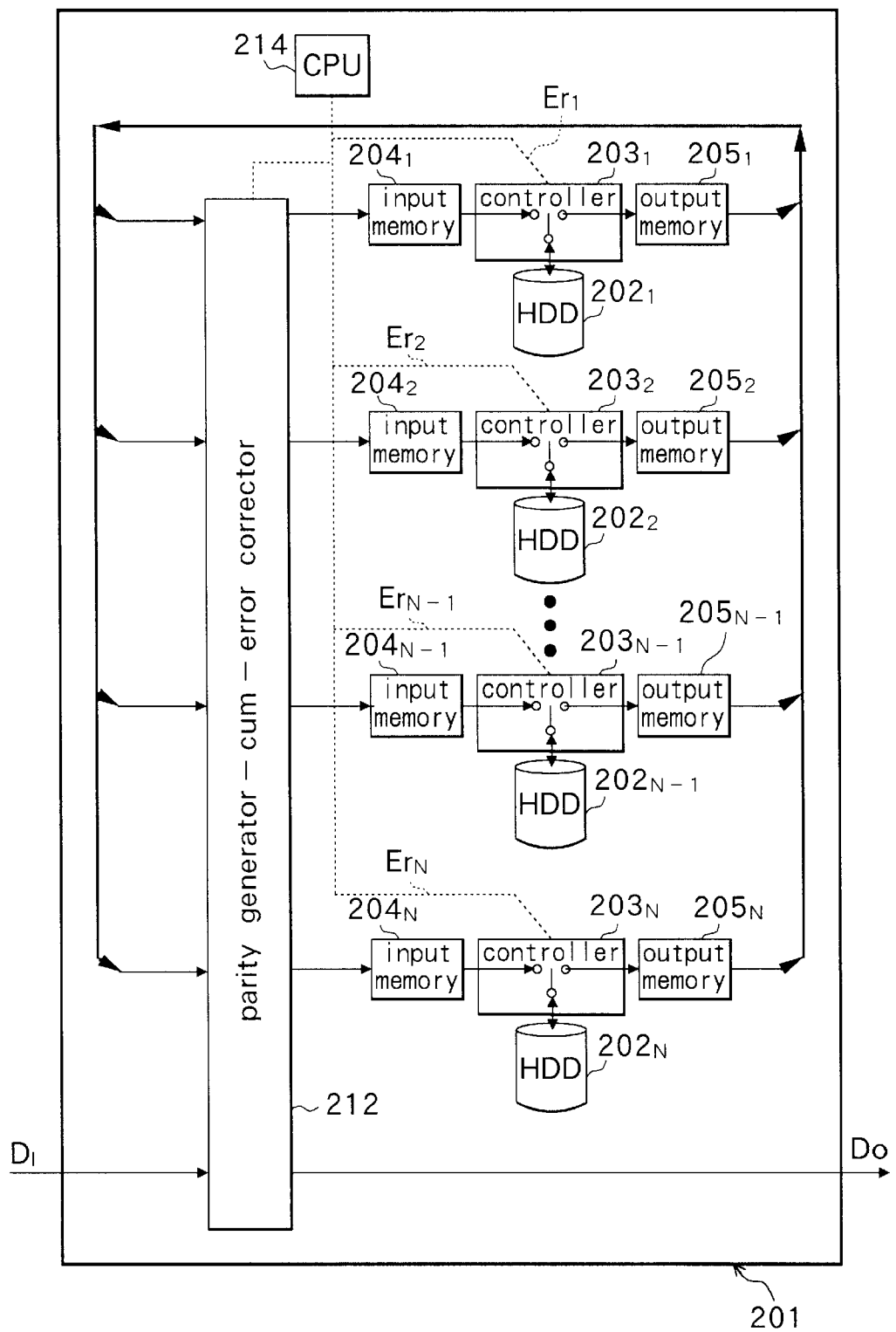
FIG. 12 is a block diagram showing a configuration example of the data recording and reproducing apparatus using the RAID-5.

In FIG. 10, the horizontal axis represents the error-occurring probability $P_U$ in one HDD independently, and the vertical axis represents the error-occurring probability $P_S$ in the whole data recording and reproducing apparatus. The line referred to with the reference character R6 shows the correlation between the error-occurring probability $P_U$ in one HDD independently, and the error-occurring probability $P_S$ in the whole apparatus, with regard to the data recording and reproducing apparatus according to the embodiment. The line referred to with the reference character R3 shows the correlation between the error-occurring probability $P_U$ in one HDD independently, and the error-occurring probability $P_S$ in the whole apparatus, with regard to the data recording and reproducing apparatus using the RAID-3.

The line referred to with the reference character R6 is represented by the formula shown below.

$$P_S = {}_{16}C_3 P_U^3 (1-P_U)^{13}$$

Likewise, the line referred to with the reference character R3 is represented by the formula shown below.

$$P_S = 2 \times {}_8C_2 P_U^2 (1-P_U)^6$$

In FIG. 10, the reference character D shows the difference in the error-occurring probability $P_S$ in the whole apparatus between the data recording and reproducing apparatus according to the embodiment and the data recording and reproducing apparatus using the RAID-3, with the error correcting probability $P_U$ in one HDD independently set to a fixed value. As evident from the difference D in the error-occurring probability $P_S$ between the two apparatuses, the data recording and reproducing apparatus according to the embodiment has the smaller error-occurring probability $P_S$ than the data recording and reproducing apparatus using the RAID-3, and is more reliable.

In FIG. 10, the line referred to with the reference character C shows the relation of $P_U = P_S$ if the RAID is not used. In the region below the line C, the error-occurring probability $P_S$ in the whole apparatus becomes smaller than the error-occurring probability $P_U$ in one HDD independently, and the apparatus becomes more reliable. The intersection points at which the lines R6 and R3 cross the line C are the diverging points at which the apparatus starts to become more reliable compared to a case where the RAID is not used. The points at which the lines R6 and R3 cross the line C, that is, the diverging points, are given reference characters A and B respectively. The data recording and reproducing apparatus according to the embodiment is more reliable compared to a case where the RAID is not used if it has the smaller probability $P_U$ than the probability $P_U$ at the diverging point A. The data recording and reproducing apparatus using the RAID-3 is more reliable compared to a case where the RAID is not used if it has the smaller probability $P_U$ than the probability $P_U$ at the diverging point B.

Since the probability $P_U$ at the diverging point A is larger than the probability $P_U$ at the diverging point B, it is clear that the data recording and reproducing apparatus according to the embodiment is more tolerant to random errors and more reliable compared to the data recording and reproducing apparatus using the RAID-3.

The results of the comparison as described above shows that the data recording and reproducing apparatus according to the embodiment is more reliable compared to the data recording and reproducing apparatus using the RAID-3, with the equal capacity and redundancy.

It is to be understood that the invention is not limited to the above-mentioned embodiment. In the embodiment, for example, a hard disk is used as the recording medium for recording divided data and error-correction-code data. However, the recording medium is not limited to a hard disk; a magneto-optical disk or a semiconductor memory may be used instead.

In addition, the error-correction-code data is not limited to the data using the Read-Solomon code; the data using other error-correction code may be employed if it can correct errors of a plurality of divided data.

While an example of recording two bytes of the error-correction-code data (redundancy-code data) on two HDDs has been described in the embodiment, three or more bytes of the error-correction-code data may be recorded on three or more HDDs. If the more number of bytes of the errorcorrection-code data increases, the redundancy becomes larger but the number of the divided data in which errors can be corrected increases. Therefore, the apparatus becomes more reliable.

Besides, the embodiment has been described on the assumption that the invention is applied to, for example, a multi-channel video server used for recording and reproducing video/audio data in a broadcasting station or the like. However, it is to be understood that the invention is not limited in its application to a multi-channel video server but can be applied to apparatuses used for recording and reproducing other kinds of data.

As described, according to the invention, the apparatus and the method for recording and reproducing data and AV server, which are excellent in ability to detect and correct errors of data and are suitable for processing which requires a real-time operation, can be implemented.

In addition, according to the invention, the apparatus and the method for recording and reproducing data and AV server, which can detect and correct errors of data even during the error-restoring processing and are suitable for processing which requires a real-time operation, can be implemented.

Moreover, according to the invention, the apparatus and the method for recording and reproducing data and AV server, which can perform the data-restoring processing without interrupting the operation of recording and reproducing data, can be implemented.

Besides, according to the invention, the apparatus and the method for recording and reproducing data and AV server, which can detect and correct errors of data even during the Reassign, can perform the Reassign without interrupting the operation of recording and reproducing data, and are suitable for processing which requires a real-time operation, can be implemented.

Furthermore, according to the invention, the apparatus and the method for recording and reproducing data, which can detect and correct errors of data even in the data-restoring-processing after the Reassign, can be implemented.

What is claimed is:

1. A data recording and reproducing apparatus comprising:

dividing means for generating a plurality of divided data by dividing input data by a predetermined unit;

means for generating error-correcting-code data for generating a plurality of error-correcting-code data corresponding to the divided data, the divided data being inputted to the means for generating error-correcting-code data;

means for recording and reproducing divided data for recording the divided data on the respective first non-linear accessible recording media, the divided data being inputted to the means for recording and reproducing divided data, while reproducing the divided data recorded on the first non-linear accessible recording media;

means for recording and reproducing error-correcting-code data for recording the error-correcting-code data on respective second non-linear accessible recording media, the error-correcting-code data being generated by the means for generating error-correcting-code data and inputted to the means for recording and reproducing error-correcting-code data, while reproducing the error-correcting-code data recorded on the second non-linear accessible recording media;

error-correcting means for performing error-correcting processing on the divided data using the error-correcting-code data, the error-correcting-code data being reproduced by the means for recording and reproducing error-correcting-code data and inputted to the error-correcting means, and the divided data being reproduced by the means for recording and reproducing divided data and inputted to the error-correcting means; and multiplying means for multiplying and outputting the divided data, the divided data being outputted from the error-correcting means and inputted to the multiplying means.

2. A data recording and reproducing apparatus according to claim 1, wherein:

the means for recording and reproducing divided data records the divided data on the respective first non-linear accessible recording media; and the means for recording and reproducing error-correcting data records the error-correcting-code data on the respective second non-linear accessible recording media.

3. A data recording and reproducing apparatus according to claim 1 wherein the error-correcting-code data is Read-Solomon code data.

4. A data recording and reproducing apparatus according to claim 1 wherein the first and the second non-linear accessible recording media are hard disks.

5. A method of recording and reproducing data including:

a first step of generating a plurality of divided data by dividing input data by a predetermined unit;

a second step of generating a plurality of error-correcting-code data corresponding to the divided data, the divided data being inputted;

a third step of recording the divided data on a first non-linear accessible recording medium, the divided data being inputted, while recording the error-correcting-code data on a second non-linear accessible recording medium;

a fourth step of reproducing the divided data from the first non-linear accessible recording medium, while reproducing tie error-correcting-code data from the second non-linear accessible recording medium;

a fifth step of performing error-correcting processing on the divided data using the error-correcting-code data if any of the divided data cannot be reproduced in the fourth step, the divided data and the error-correcting-code data being reproduced in the fourth step and inputted; and a sixth step of multiplying and outputting the divided data, the divided data being outputted in the fifth step and inputted.

6. A method of recording and reproducing data according to claim 5, wherein in the third step the divided data is recorded on the respective first non-linear accessible recording media, while the error-correcting-code data is recorded on the respective second non-linear accessible recording media.

7. A method of recording and reproducing data according to claim 5, wherein the error-correcting-code data is Read-Solomon code data.

8. A method of recording and reproducing data according to claim 5, wherein the first and the second non-linear accessible recording media are hard disks.

9. A data recording and reproducing apparatus comprising:

means for recording and reproducing divided data for recording a plurality of divided data obtained through a dividing means for dividing the input data by a predetermined unit and recording the divided data on a first non-linear accessible recording medium, while reproducing the divided data recorded on the first non-linear accessible recording medium;

means for generating error-correcting-code data for outputting the error-correcting-code data for the divided data, the divided data being inputted from the dividing means;

means for recording and reproducing the error-correcting-code data on a second non-linear accessible recording medium, while reproducing the error-correcting-code data recorded on the second non-linear accessible recording medium;

error-correcting means for performing error-correcting processing on the divided data reproduced from the means for recording and reproducing divided data using the error-correcting-code data reproduced from the means for recording and reproducing error-correcting-code data;

means for controlling data-restoring processing for performing restoring processing on the divided data through: controlling the means for recording and reproducing divided data and the means for recording and reproducing error-correcting-code data to reproduce the divided data and the error-correcting-code data corresponding to the divided data, which are recorded on the first non-linear accessible recording medium and the second non-linear accessible recording medium respectively, except the divided data to be restored; controlling the error-correcting means to perform error-correcting processing on the divided data based on the divided data and the error-correcting-code data; and controlling the means for recording and reproducing divided data to record the divided data to be restored on which the error-correcting processing has been performed on the first non-linear accessible recording medium; and multiplying means for multiplying and outputting the divided data, the divided data being outputted from the error-correcting means.

10. A data recording and reproducing apparatus according to claim 9, wherein:
the means for recording and reproducing divided data records the divided data on the respective first non-linear accessible recording media; and
the means for recording and reproducing error-correcting-code data records the error-correcting-code data on the respective second non-linear accessible recording media.

11. A data recording and reproducing apparatus according to claim 9, wherein the means for controlling data-restoring processing performs restoring processing on the divided data in part of the recording region of the first non-linear accessible recording medium.

12. A data recording and reproducing apparatus according to claim 9, wherein the means for controlling data-restoring processing performs restoring processing of the divided data in the whole recording region of the first non-linear accessible recording medium.

13. A data recording and reproducing apparatus according to claim 12, wherein the means for controlling data-restoring processing performs the restoring processing on the divided data if any of the divided data is not recorded on the first non-linear accessible recording medium or any of the divided data is not reproduced from the first recording medium, while the first recording medium to be restored is excluded from the divided data to be reproduced until the restoring processing of the first recording medium is completed.

14. A data recording and reproducing apparatus according to claim 9, wherein the error-correcting-code data is Read-Solomon code data.

15. A data recording and reproducing apparatus according to claim 9, wherein the first and the second non-linear accessible recording media are hard disk.

16. A data recording and reproducing apparatus according to claim 9, wherein the means for controlling data-restoring processing performs restoring processing on the divided data if any of the divided data is not recorded on the first non-linear accessible recording medium or any of the divided data is not reproduced from the first recording medium.

17. A method of recording and reproducing data including:
a first step of recording a plurality of divided data obtained through dividing input data by a predetermined unit on a first non-linear accessible recording medium, while generating a plurality of error-correcting-code data for the divided data to record them on a second non-linear accessible recording medium;
a second step of reproducing the divided data recorded on the first recording medium in the first step, while reproducing the error-correcting-code data recorded on the second non-linear accessible recording medium;
a third step of performing error correcting processing on the divided data reproduced in the second step based on the error-correcting-code data reproduced in the second step, wherein the third step includes a multiplying step of multiplying and outputting the divided data on which the error-correcting processing has been performed; and
a fourth step of performing restoring processing on the divided data which cannot be recorded on the first recording medium in the first step and needs to be restored and recorded thereon through: reproducing the divided data and the error-correcting-code data corresponding to the divided data, which are recorded on the first recording medium and the second recording medium respectively, except the divided data to be restored, from the first recording medium and the second recording medium; performing error-correcting processing on at least the divided data to be restored based on the reproduced divided data and the error-correcting-code data which have been reproduced; and re-recording the divided data to be restored on which the error-correcting processing has been performed on the first recording medium.

18. A method of recording and reproducing data according to claim 17, wherein in the first step the divided data is recorded on the respective first non-linear accessible recording media, while the error-correcting-code data is recorded on the respective second non-linear accessible recording media.

19. A method of recording and reproducing data according to claim 17, wherein the error-correcting-code data is Read-Solomon-code data.

20. A method of recording and reproducing data according to claim 17, wherein the first and the second non-linear accessible recording media are hard disks.

21. A method of recording and reproducing data according to claim 17, wherein the restoring processing as in the fourth step is performed on part of the recording region of the first recording medium.

22. A method of recording and reproducing data according to claim 17, wherein the restoring processing as in the fourth step is performed on the whole recording region of the first recording medium.

23. A method of recording and reproducing data according to claim 17, wherein the restoring processing as in the fourth step is performed if any of the divided data is not recorded on the first recording medium or any of the divided data recorded in the first recording medium is not reproduced.

24. A method of recording and reproducing data according to claim 17, wherein the restoring processing as in the fourth step is performed if any of the divided data is not recorded on the first recording medium or any of the divided data recorded on the first recording medium is not reproduced, while the first recording medium to be restored is excluded from the divided data to be reproduced until the restoring processing is completed on the whole recording region of the first recording medium.

25. A data recording and reproducing apparatus comprising:
   means for recording and reproducing divided data for recording a plurality of divided data obtained through dividing input data by a predetermined unit on a plurality of first non-linear accessible recording media, respectively, while reproducing the divided data recorded on the first recording media;
   means for recording and reproducing error-correcting-code data for generating a plurality of error-correcting-code data for the divided data to record the error-correcting-code data on a second non-linear accessible recording medium, while reproducing the error-correcting-code data recorded on the second recording medium; and
   means for controlling re-allotting processing for controlling the means for recording and reproducing divided data to exclude the first recording medium subject to re-allotting processing, in which the correspondence between logical address and physical address in the recording region of the first recording media is changed, from other first recording media on which recording and reproducing are performed by the means for recording and reproducing divided data, and to perform the re-allotting processing.

26. A data recording and reproducing apparatus according to claim 25 further comprising:
   means for generating divided data for generating the divided data by dividing the input data by a predetermined unit;
   means for generating error-correcting-code data for generating the error-correcting-code data based on the divided data generated in the means for generating divided data;
   means for processing error-correcting for performing error-correcting processing on the divided data reproduced from the means for recording and reproducing divided data using the error-correcting-code data reproduced in the means for recording and reproducing error-correcting-code data; and
   multiplying means for multiplying and outputting the divided data outputting from the means for processing error-correcting.

27. A data recording and reproducing apparatus according to claim 26, wherein the means for processing error-correcting performs error-correcting to restore the divided data which cannot be obtained from the divided data reproduced from another means for recording and reproducing divided data and the error-correcting-code data reproduced from the means for recording and reproducing error-correcting-code data, if the divided data to be reproduced from the means for recording and reproducing divided data cannot be obtained.

28. A data recording and reproducing apparatus according to claim 25, wherein the means for recording and reproducing error-correcting-code data records the error-correcting code on the respective second recording media.

29. A data recording and reproducing apparatus according to claim 25, wherein the error-correcting-code data is Read-Solomon code data.

30. A data recording and reproducing apparatus according to claim 25, wherein the first and the second non-linear accessible recording media are hard disks.

31. A data recording and reproducing apparatus according to claim 25 further comprising:
   means for processing error-correcting for performing error-correcting processing on the divided data reproduced from the means for recording and reproducing divided data using the error-correcting-code data reproduced in the means for recording and reproducing error-correcting-code data; and
   means for controlling data-restoring processing for performing restoring processing on divided data through: controlling the means for recording and reproducing divided data and the means for recording and reproducing error-correcting-code data to reproduce the divided data and the error-correcting-code data corresponding to the divided data, which are recorded on the first recording media and the second recording medium respectively, except the divided data to be restored, from the first recording media and the second recording medium; controlling the means for processing error-connecting to perform error-correcting processing on the divided data based on the divided data and the error-correcting-code data which have been reproduced; and controlling the means for recording and reproducing divided data to record the divided data to be restored on which the error-correcting processing has been performed, on the first recording medium.

32. A data recording and reproducing apparatus according to claim 31, wherein the means for controlling data-restoring processing performs restoring processing on the divided data if recording or reproducing the divided data on/from the first recording media is not performed.

33. An AV server comprising:
   a plurality of input/output processing means for converting data including visual and audio data inputted from outside to data which can be recorded on a non-linear accessible recording medium, while outputting the data outputted from the recording medium after converting the data to data which can be outputted outside;
   means for recording and reproducing divided data for recording a plurality of divided data obtained through dividing data outputted from each of the input/output processing means on a first non-linear accessible recording medium, while reproducing the divided data recorded on the first non-linear accessible recording medium;
   means for recording and reproducing error-correcting-code data for generating the error-correcting-code data for the divided data to record the error-correcting-code data on a second non-linear accessible recording medium, while reproducing the error-correcting-code data recorded on the second non-linear accessible recording medium; and means for controlling re-allotting processing for controlling the means for recording and reproducing divided data to exclude the first recording medium subject to re allotting processing, in which the correspondence between logical address and physical address in the recording region of the first recording medium is changed from other first recording media on which recording and reproducing are performed by the means for recording and reproducing divided data, and to perform the re-allotting processing.

34. A method of recording and reproducing data including:

a first step of recording a plurality of divided data obtained through dividing input data by a predetermined unit on a first non-linear accessible recording medium, while generating a plurality of error-correcting-code data for the divided data to record the error-correcting-code data on a second non-linear accessible recording medium;

a second step of reproducing the divided data recorded on the first non-linear accessible recording medium in the first step, while reproducing the error-correcting-code data recorded on the second non-linear accessible recording medium; and a third step of excluding the first recording medium subject to re-allotting processing, in which the correspondence between the logical address and physical address in the recording region of the first recording medium is changed, from other first recording media on which recording and reproducing are performed by the means for recording and reproducing divided data in the first and second steps, and of performing re-allotting processing.

35. A method of recording and reproducing data according to claim 34 further including a fourth step of:

performing error-correcting processing on the divided data reproduced in the second step based on the error-correcting-code data reproduced in the second step.

36. A method of recording and reproducing data according to claim 35 further including a fifth step of:

multiplying and outputting the divided data, the divided data being outputted in the fourth step and inputted.

37. A method of recording and reproducing data according to claim 34, wherein in the first step the divided data is recorded on the respective first recording media, while the error-correcting-code data is recorded on the respective second recording media.

38. A method of recording and reproducing data according to claim 34, wherein the error-correcting-code data is Read-Solomon code data.

39. A method of recording and reproducing data according to claim 34, wherein the first and the second non-linear accessible recording media are hard disks.

40. A method of recording and reproducing data according to claim 34 further including a restoring-processing step of:

performing restoring-processing on the divided data through: reproducing the divided data and the error-correcting-code data corresponding to the divided data, which are recorded on the first and the second recording media respectively, except the divided data to be restored from the first recording medium and the second recording medium; performing error-correcting processing on at least the divided data to be restored based on the reproduced divided data and the error-correcting-code data which have been reproduced; and recording the divided data to be restored on which the error-correcting processing has been performed, on the first recording medium.

41. A method of recording and reproducing data according to claim 40, wherein the restoring processing is performed if the divided data is not recorded on the first recording medium or the divided data recorded on the first recording medium is not reproduced.

* * * * *